US012673006B2

(12) United States Patent
Gyory et al.

(10) Patent No.: US 12,673,006 B2
(45) Date of Patent: Jul. 7, 2026

(54) MEDICAMENT FILLING SYSTEM

(71) Applicant: Becton, Dickinson and Company, Franklin Lakes, NJ (US)

(72) Inventors: J. Richard Gyory, Sudbury, MA (US); Mark Newby, Kamas, UT (US); Bradley Wilkinson, North Haledon, NJ (US); Bart Peterson, Farmington, UT (US); Alessandro Pizzochero, Chelmsford, MA (US); Sergey Grigoryants, Malden, MA (US); Bo Yang Yu, Winchester, MA (US); Heena Dani, Middlesex, NJ (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 1135 days.

(21) Appl. No.: 17/764,442

(22) PCT Filed: Sep. 25, 2020

(86) PCT No.: PCT/US2020/052747

§ 371 (c)(1),
(2) Date: Mar. 28, 2022

(87) PCT Pub. No.: WO2021/067133

PCT Pub. Date: Apr. 8, 2021

(65) Prior Publication Data

US 2022/0362106 A1 Nov. 17, 2022

Related U.S. Application Data

(60) Provisional application No. 62/908,343, filed on Sep. 30, 2019.

(51) Int. Cl.
*A61J 3/00* (2006.01)
*A61J 1/14* (2023.01)
*A61J 1/20* (2006.01)

(52) U.S. Cl.
CPC .......... *A61J 1/2096* (2013.01); *A61J 1/1406* (2013.01); *A61J 1/201* (2015.05); *A61J 1/2037* (2015.05);
(Continued)

(58) Field of Classification Search
CPC ........ A61J 1/201; A61J 1/1406; A61J 1/2037; A61J 1/2048; A61J 1/2065; A61J 1/2075; A61J 1/2096
See application file for complete search history.

(56) References Cited

U.S. PATENT DOCUMENTS 5,637,092 A 6/1997 Shaw
8,062,254 B2 11/2011 MacLean
(Continued)

FOREIGN PATENT DOCUMENTS

CN 101686896 A 3/2010
EP 0327519 B1 8/1989
(Continued)

OTHER PUBLICATIONS

CN Patent Application No. 202011029249.7, Office Action issued May 9, 2025 (with English translation).
(Continued)

*Primary Examiner* — Eyamindae C Jallow
(74) *Attorney, Agent, or Firm* — Dickinson Wright, PLLC

(57) ABSTRACT

A medicament filling system (30) provides medicament to a delivery device (20). The medicament filling system (30) comprises a main housing (40) having an air pump (42), a vial adapter (44) that is configured to engage a vial (10) containing medicament, the vial adapter (44) being in communication with the air pump (42), a syringe housing (46) that carries a syringe (70), the syringe housing (46) being in selective communication with the vial adapter (44) and the
(Continued)

delivery device (20), and a valve (60) that locks and unlocks movement of a plunger (72) in the syringe (70).

29 Claims, 28 Drawing Sheets

(52) U.S. Cl.
CPC ........... *A61J 1/2048* (2015.05); *A61J 1/2065* (2015.05); *A61J 1/2075* (2015.05)

(56) References Cited

U.S. PATENT DOCUMENTS

| | | | | |
|---|---|---|---|---|
| 8,777,906 | B1 | 7/2014 | Gray | |
| 9,101,534 | B2 * | 8/2015 | Bochenko | B65B 3/003 |
| 9,510,997 | B2 * | 12/2016 | Kriheli | A61J 1/2082 |
| 10,406,072 | B2 * | 9/2019 | Chhikara | A61M 5/31513 |
| 10,625,019 | B2 * | 4/2020 | Wallmann | A61M 5/24 |
| 10,729,618 | B2 | 8/2020 | Yaegashi | |
| 10,881,583 | B2 * | 1/2021 | Kriheli | A61J 1/1406 |
| 11,040,138 | B2 | 6/2021 | Hooven et al. | |
| 11,458,292 | B2 * | 10/2022 | Erichsen | A61M 5/158 |
| 11,806,308 | B2 * | 11/2023 | Lopez | A61J 1/2062 |
| 12,023,304 | B2 * | 7/2024 | Lopez | B60J 7/141 |
| 2003/0105430 | A1 | 6/2003 | Lavi et al. | |
| 2010/0218846 | A1 | 9/2010 | Kriheli | |
| 2011/0264069 | A1 | 10/2011 | Bochenko | |
| 2014/0276386 | A1 | 9/2014 | Mansour et al. | |
| 2015/0053305 | A1 | 2/2015 | Davidian et al. | |
| 2015/0057638 | A1 | 2/2015 | Davidian et al. | |
| 2016/0144105 | A1 | 5/2016 | Hooven et al. | |
| 2018/0021521 | A1 | 1/2018 | Sanchez | |
| 2018/0126085 | A1 | 5/2018 | Shire | |
| 2019/0216683 | A1 | 7/2019 | Yaegashi | |
| 2022/0054357 | A1 * | 2/2022 | Lanier, Jr. | A61J 1/2096 |

FOREIGN PATENT DOCUMENTS

| | | |
|---|---|---|
| JP | 2016524513 | 8/2016 |
| WO | 2018-056050 | 3/2018 |
| WO | 2018/085768 A1 | 5/2018 |

OTHER PUBLICATIONS

JP Patent Application No. 2024-216363, Office Action issued Jul. 22, 2025 (with English translation).

* cited by examiner

MEDICAMENT FILLING SYSTEM

RELATED APPLICATION

This application claims the benefit under 35 U.S.C. § 119(e) of U.S. Provisional Patent Application Ser. 62/908,343, filed on Sep. 30, 2019, which is hereby incorporated by reference in its entirety.

FIELD OF THE INVENTION

Various exemplary embodiments of the invention relate to filling a delivery device with medicament via a medicament filling system such as a syringe assembly.

BACKGROUND OF THE INVENTION

Systems such as delivery devices and syringe assemblies are typically used to inject medication, such as insulin, into a patient. However, inefficiencies and inconveniences can arise. These challenges include minimizing air entering into the delivery device, preventing medicament backflow from exiting the delivery device during and after the filling step, and improving safety, handling and stability.

SUMMARY OF THE INVENTION

It is an aspect of the present invention to provide a medicament filling system that aids in improved alignment and engagement with a delivery device. Upon engagement, the medicament filling system removes undesired air from the delivery device prior to filling the delivery device with medicament. After the delivery device is filled with the medicament, the medicament filling system is configured to prevent medicament backflow from the delivery device into the medicament filling system. Such as a system provides efficient and improved accuracy of the medicament transferred to the delivery device.

Another aspect of the present invention provides a syringe assembly that fills the delivery device with medicament. After filling is complete, the syringe assembly is locked to prevent backflow of the medicament into the syringe assembly.

In another aspect of the present invention, a syringe assembly includes an adapter having ergonomic features to improve safety, handling and stability. In yet another aspect of the present invention, the adapter has a needle that engages a needless syringe reusable for filling the delivery device.

The foregoing and/or other aspects of the present invention can be achieved by providing a medicament filing system that provides medicament to a delivery device, the medicament filling system comprising a main housing having an air pump, a vial adapter that is configured to engage a vial containing medicament, the vial adapter being in communication with the air pump, a barrel being in selective communication with the vial adapter and the delivery device, and a valve that locks and unlocks movement of a plunger in the barrel.

The foregoing and/or other aspects of the present invention can further be achieved by providing a method of using a medicament filling system to fill medicament into a delivery device, the method comprising attaching the medicament filling system to the delivery device, establishing fluid communication between the delivery device and the medicament filling system, connecting a vial to the medicament filling system to establish fluid communication, setting a dosage on a plunger of a barrel in the medicament filling system, releasing the plunger of the barrel, pulling the plunger to remove air from the delivery device, transferring the medicament from the vial to the barrel, and filling the delivery device with medicament.

The foregoing and/or other aspects of the present invention can also be achieved by providing a medicament filing system that provides medicament to a delivery device, the medicament filling system comprising an alignment platform having a needle configured to be in communication with the delivery device, the alignment platform including an air pump that removes air from the delivery device, a septum configured to engage the air pump, and a needle cover that encloses the needle when not in use.

The foregoing and/or other aspects of the present invention can additionally be achieved by providing a syringe assembly for providing medicament to a delivery device, the syringe assembly comprising a syringe comprising a dial dose that sets a dosage amount, the dial dose being disposed on a plunger head, a plunger including the plunger head disposed on a proximal end of the plunger, and a syringe barrel connected to a needle, and a plunger lock assembly, wherein after the syringe delivers the medicament to the delivery device, the plunger lock assembly prevents backflow of the medicament into the syringe.

The foregoing and/or other aspects of the present invention can further be achieved by providing a syringe assembly for filling a syringe and a delivery device with medicament, the syringe assembly comprising a syringe having a needle for transferring the medicament, and an adapter configured to engage a vial carrying the medicament, wherein the adapter includes one of an ergonomic feature or a needle depth control feature.

The foregoing and/or other aspects of the present invention can also be achieved by providing a syringe assembly for filling a syringe and a delivery device with medicament, the syringe assembly comprising a needleless syringe having a syringe connector, an adapter including a needle that is configured to engage a vial carrying the medicament, and an adapter connector that is configured to engage the syringe connector, wherein a distal end of the adapter engages the vial to receive medicament and engages the delivery device to transfer the medicament.

Finally, the foregoing and/or other aspects of the present invention can additionally be achieved by providing a syringe assembly for filling a syringe and a delivery device with medicament, the syringe assembly comprising a syringe having a needle for transferring the medicament, an adapter attached to the syringe and configured to engage a vial carrying the medicament, the adapter including a housing that encloses the syringe, and a base that is configured to mount onto the delivery device, wherein when the adapter is engaged to the vial, the medicament travels from the vial to the syringe, and when the adapter is engaged to the delivery device, the medicament travels from the syringe to the delivery device.

Additional and/or other aspects and advantages of the present invention will be set forth in the description that follows, or will be apparent from the description, or may be learned by practice of the invention.

BRIEF DESCRIPTION OF THE DRAWINGS

The above aspects and features of the present invention will be more apparent from the description for the exemplary embodiments of the present invention taken with reference to the accompanying drawings, in which.

DETAILED DESCRIPTION OF EXEMPLARY EMBODIMENTS

Figure 1:
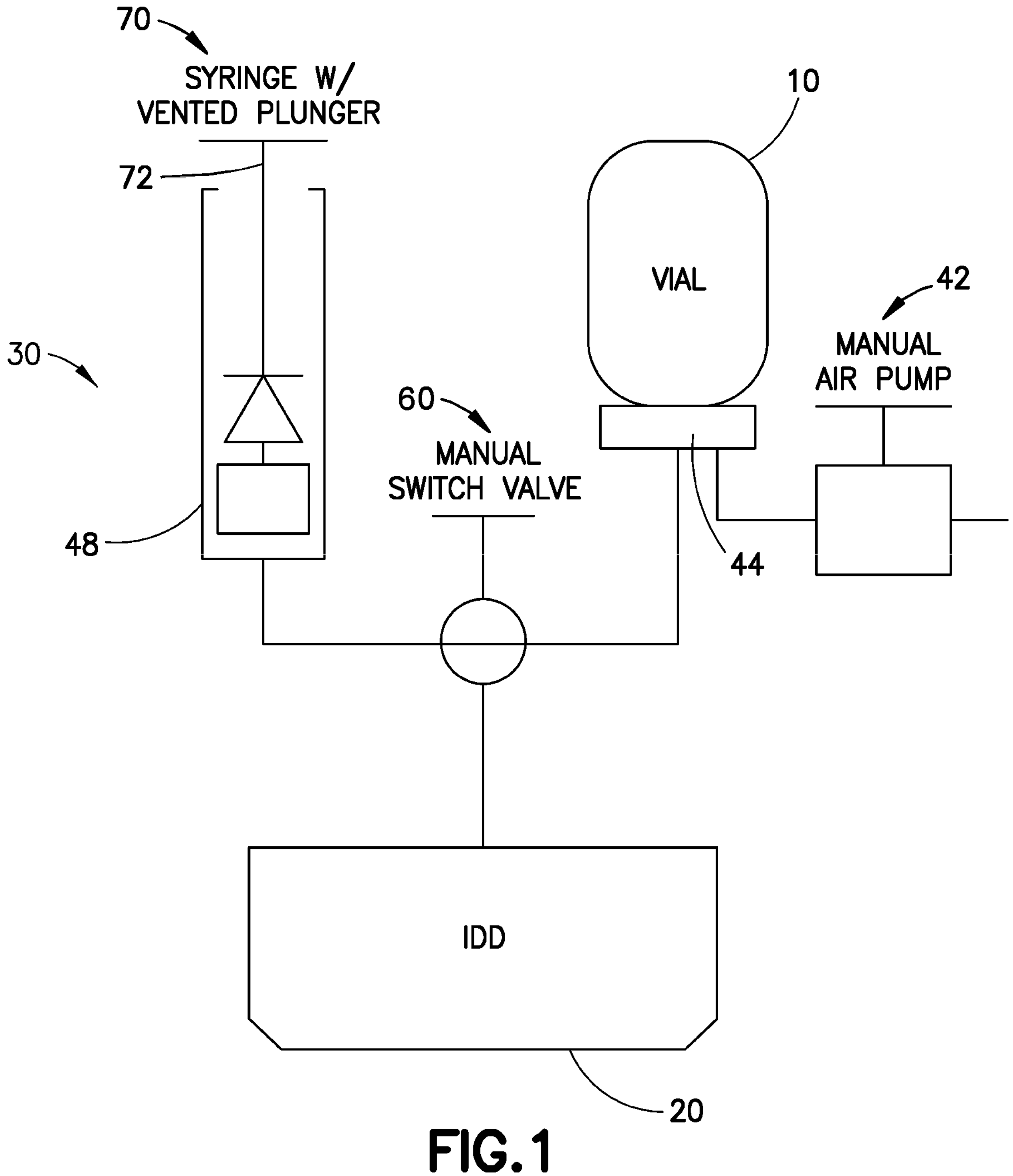
FIG. 1 is a first exemplary embodiment of a schematic of a medicament filling system.

FIGS. 1-5 illustrate a medicament filling system 30, according to one embodiment. The medicament filling system 30 is configured to engage a vial 10 to receive medicament and an insulin delivery device (IDD) 20 to transfer and fill with the medicament. FIG. 1 illustrates a schematic drawing of the overall operation of the medicament filling system 30. FIGS. 2-5 illustrate a cavity on a bottom surface of the medicament filling system 30 that advantageously provides alignment and is configured to engage the insulin delivery device 20.

Figure 2:
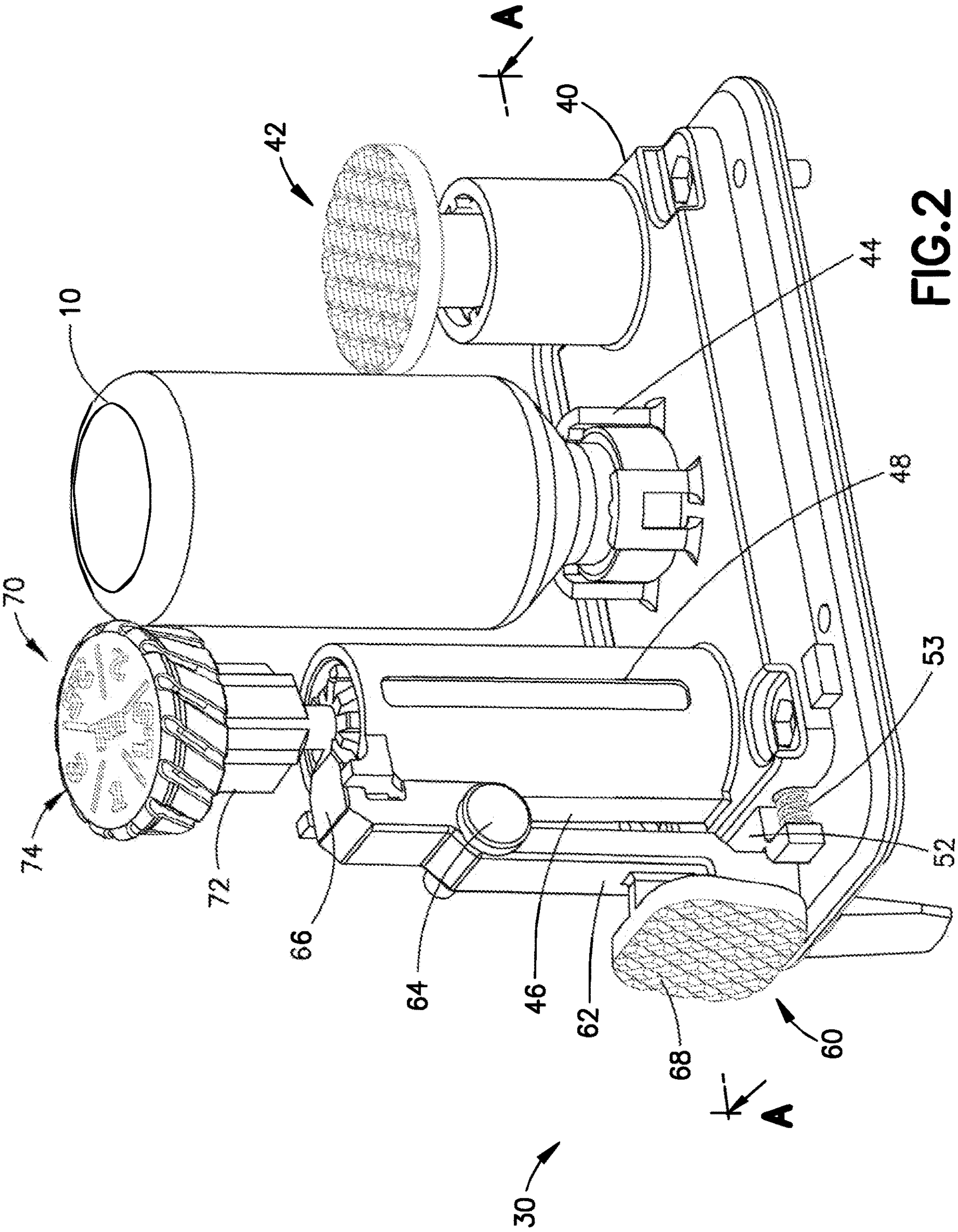
FIG. 2 is a perspective view of the medicament filling system of FIG. 1.
Figure 3:
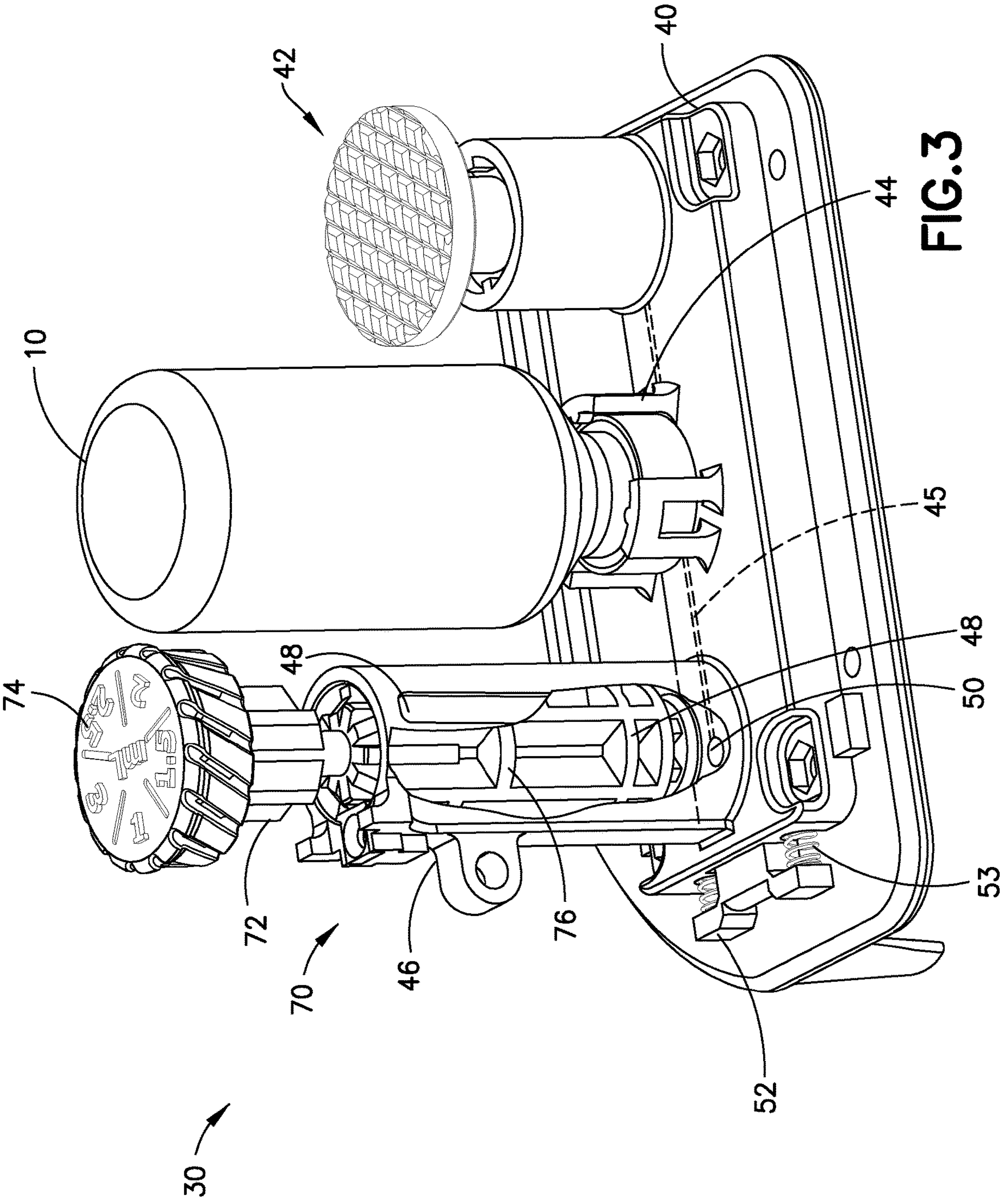
FIG. 3 is a transparent perspective view of the medicament filling system of FIG. 2.

FIGS. 2 and 3 illustrate that the medicament filling system 30 includes a main housing 40 that includes an air pump 42, a vial adapter 44, a flow path 45, a barrel 46 having a viewing window 48, an outlet port 50 communicating with a needle 54 and a spring element 52 cooperating with a spring 53. The air pump 42 is preferably manually operated but can also be automatically operated. The air pump 42 is in fluid communication with the vial adapter 44.

When a user desires to transfer the medicament from the vial 10 to the barrel 46 in the main housing 10, the vial 10 is attached to the vial adapter 44. The vial adapter 44 includes a dual lumen vial spike that pierces a septum in the vial 10. Subsequently, the user pumps the air pump 42 to supply air to the vial 10. This increased pressure in the vial 10 causes the medicament to exit the vial 10 and enter into the barrel 46 via the flow path 45.

The barrel 46 carries the medicament and includes the viewing window 48 to provide a visual indication of how much medicament is in the barrel 46. Specifically, the viewing window 48 is clear and can include dose markers that are visible when the user looks through the viewing window 48 to see how much medicament is in the barrel 46. The barrel 46 can also include a buoyant colored member that floats on top of the medicament to indicate how much medicament is in the barrel 46 when seen through the viewing window 48. Further details of the syringe barrel components 70 are described below.

Figure 4:
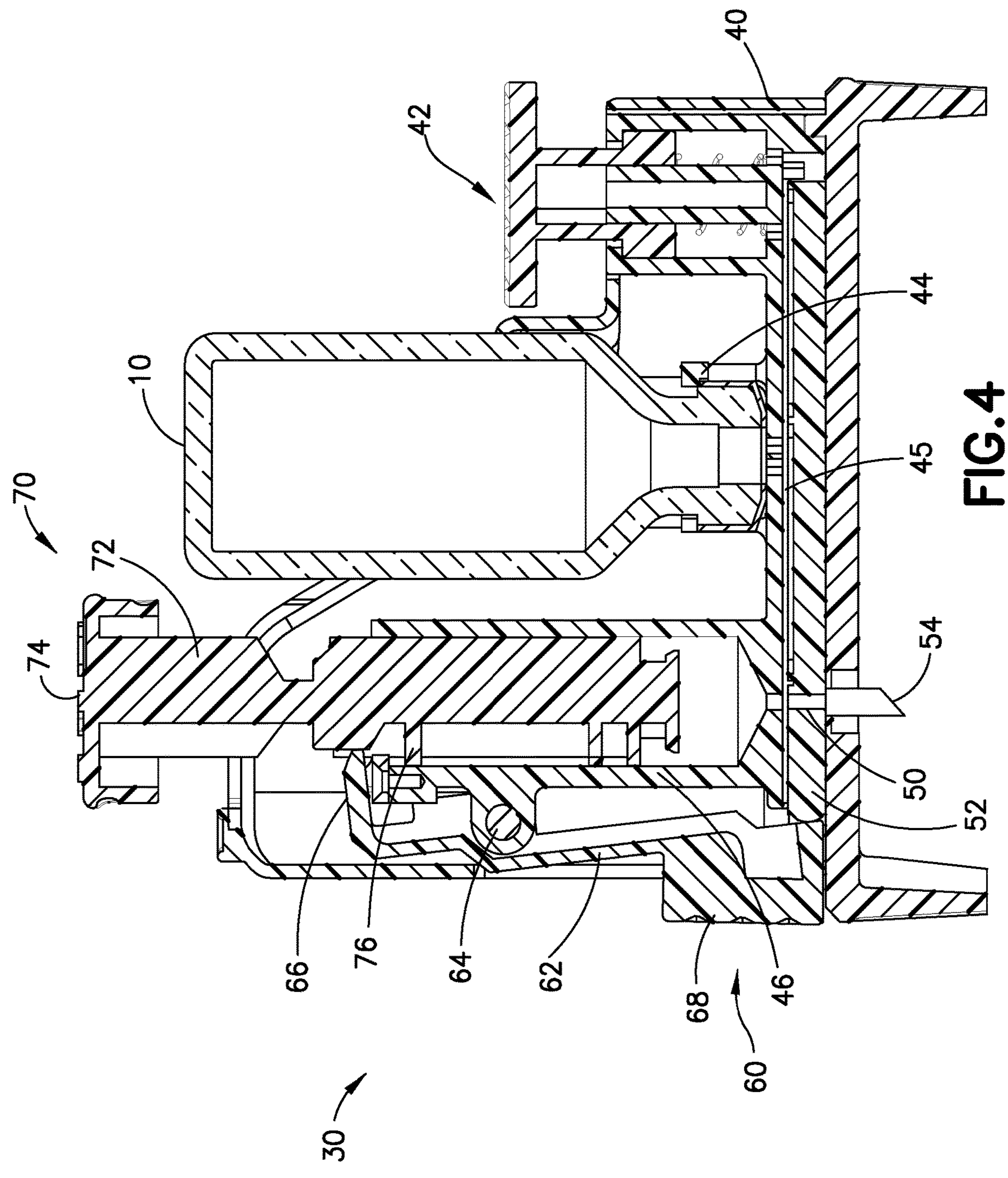
FIG. 4 is a cross-sectional view of the medicament filling system along line A-A of FIG. 2 shown when removing air from a delivery device.
Figure 5:
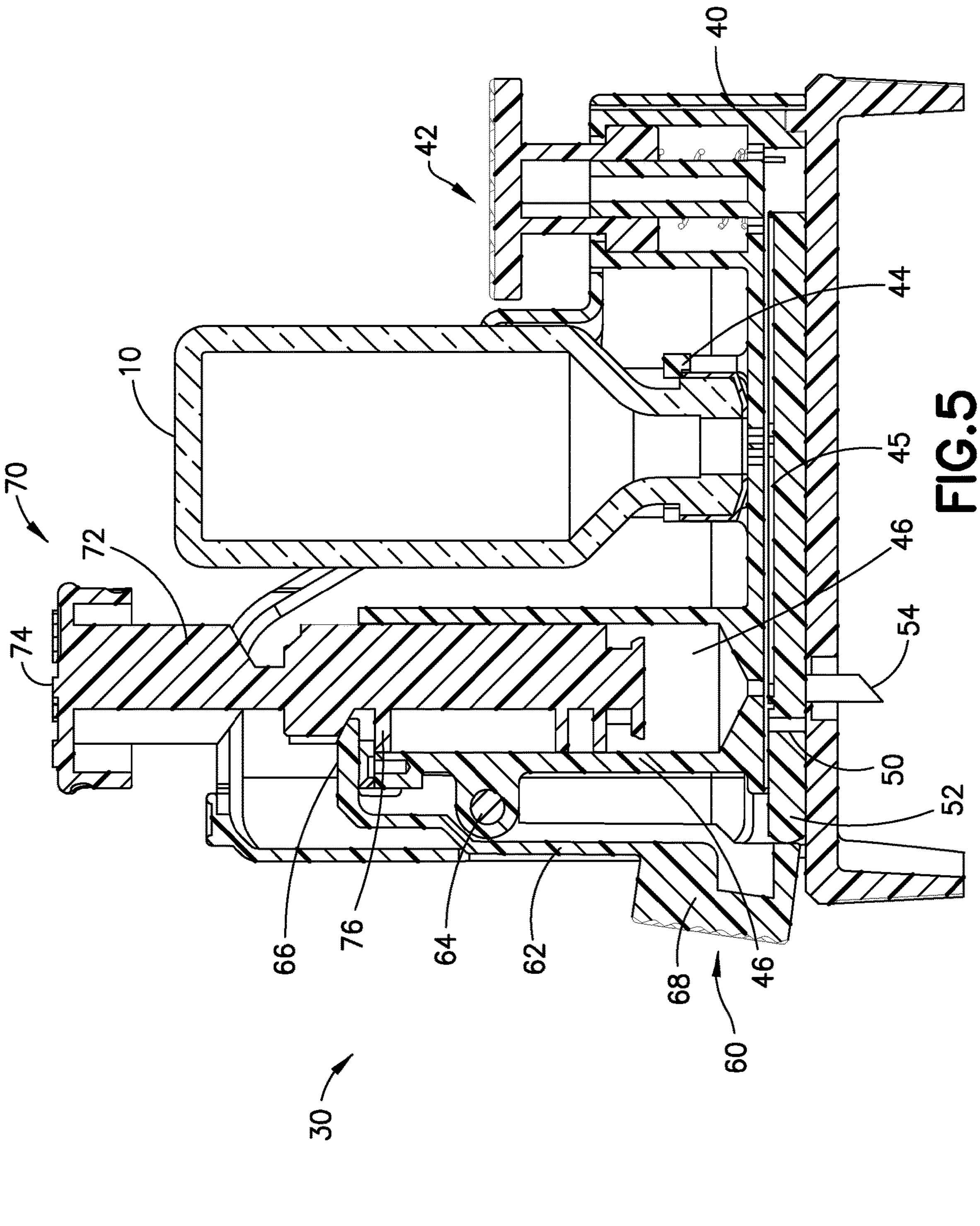
FIG. 5 is a cross-sectional view of the medicament filling system along line A-A of FIG. 2 shown when delivering medicament to the delivery system.

As illustrated in FIGS. 4 and 5, the main housing 40 also includes an outlet port 50 disposed in the spring element 52 that selectively communicates with the needle 54 and the insulin delivery device 20 based on the movement of a manual switch valve 60. The needle 54 is disposed in the cavity on the bottom surface of the medicament filling system 30. The needle 54 is configured to pierce a septum in the insulin delivery device 20. The manual switch valve 60 advantageously controls a three-way valve and cooperates with a plunger lock feature. Further details of the manual switch valve 60 are described below.

FIG. 1 illustrates that the manual switch valve 60 is disposed between the vial adapter 44, the insulin delivery device 20 and the barrel 46 to provide selective fluid communication. FIG. 4 illustrates the manual switch valve 60 depressed to move the spring element 52. In this configuration, the main housing 40 is in communication with the insulin delivery device 20 to remove air through the outlet port 50 and the needle 54. Air removal occurs when the user pulls a vented plunger 72 upward. The flow path 45 between the vial adapter 44 and the barrel 46 is misaligned and disengaged in this position.

FIG. 5 illustrates the manual switch valve 60 released (natural position) which allows the spring element 52 and the outlet port 50 to misalign from the needle 54. Accordingly, the main housing 40 is not in fluid communication with the insulin delivery device 20. Instead, the flow path 45 is aligned to provide fluid communication between the vial adapter 44 and the barrel 46. As a result, the medicament is transferred from the vial 10 to the barrel 46.

To transfer the medicament to the insulin delivery device 20, the manual switch valve 60 is depressed as illustrated in FIG. 4 to align the barrel 46, the outlet port 50 and the needle 54. The user subsequently depresses the vented plunger 72 to transfer the medicament. Accordingly, this position is used to remove air from the insulin delivery device 20 and transfer medicament to the insulin delivery device 20.

The spring element 52 is a rigid member disposed near a bottom surface of the main housing 40. As described above, the spring element 52 cooperates with the manual switch valve 60 to control the flow of the medicament. Specifically, as illustrated in FIGS. 2 and 3, the spring element 52 engages the spring 53 that bottoms out on a portion of the main housing 40 to ensure compression of the spring 53. This configuration allows the spring element 52 to slide into various flow path positions based on user manipulation of the manual switch valve 60.

The manual switch valve 60, as illustrated in FIGS. 2, 4 and 5, includes an arm 62, a pivot shaft 64, a stopping element 66 and a button 68. As described above, the manual switch valve 60 incorporates the button 68 to control the operation of the medicament filling system 30. Specifically, the button 68 is disposed on a distal end of the arm 62 adjacent to the spring element 52. Whereas, the stopping element 66 is disposed on a proximal end of the arm 62 near the top of the barrel 46.

As described below, the stopping element 66 is configured to engage and disengage one of a plurality of dial dose stops 76 to aid in dose setting. The stopping element 66 can also be disposed at the top of the barrel 46 as illustrated in FIG. 2 to advantageously prevent backflow after the medicament is transferred to the insulin delivery device 20. In this manner, the user advantageously does not have to hold the vented plunger 72 down after the medicament delivery to ensure that the medicament does not leave the insulin delivery device 20.

The arm 62 rotates about a pivot shaft 64 disposed between the button 68 and the stopping element 66. The pivot shaft 64 allows the arm 62 to rotate between an engaged and disengaged position based on user activation of the button 68.

The syringe barrel components 70 includes the vented plunger 72, a dial dose 74 and the plurality of dial dose stops 76. The vented plunger 72 advantageously includes a fluid stopping membrane to prohibit the medicament from escaping the barrel 46, and a one way valve to allow air to vent from the barrel 46 while keeping the medicament in. Specifically, the vented plunger 72 allows air to exit the medicament filling system 30 when air is removed from the insulin delivery device 20. Also, when the barrel 46 is filled with medicament, the air previously disposed in the barrel 46 is released through the vented plunger 72.

The dial dose 74 is disposed on a proximal end of the vented plunger 72. The user rotates the dial dose 74 to set the desired dose. As the dial dose 74 rotates, the plunger 72 also rotates along with the plurality of dial dose stops 76 disposed on the plunger 72. FIG. 3 illustrates the plurality of dial dose stops 76 rotationally positioned that each correspond to a different dosage. Preferably, the dial dose stops 76 are molded into and along an axial length of the plunger 72. Based on the set dose from the dial dose 74, one of the plurality of dial dose stops 76 aligns with the stopping element 66 to restrict the amount of medicament that enters into the barrel 46.

Some insulin delivery devices 20 may incorporate a flexible reservoir chamber such as a flexible bag, for example. These insulin delivery devices 20 may provide back pressure upon filling of medicament, as well as excess air that should be removed to provide high accuracy during medicament filling. The medicament filling system 30 disclosed herein advantageously prevents backflow of the medicament, and removes air to improving filling accuracy and control medicament delivery volume while minimizing needle exposure.

Figure 6:
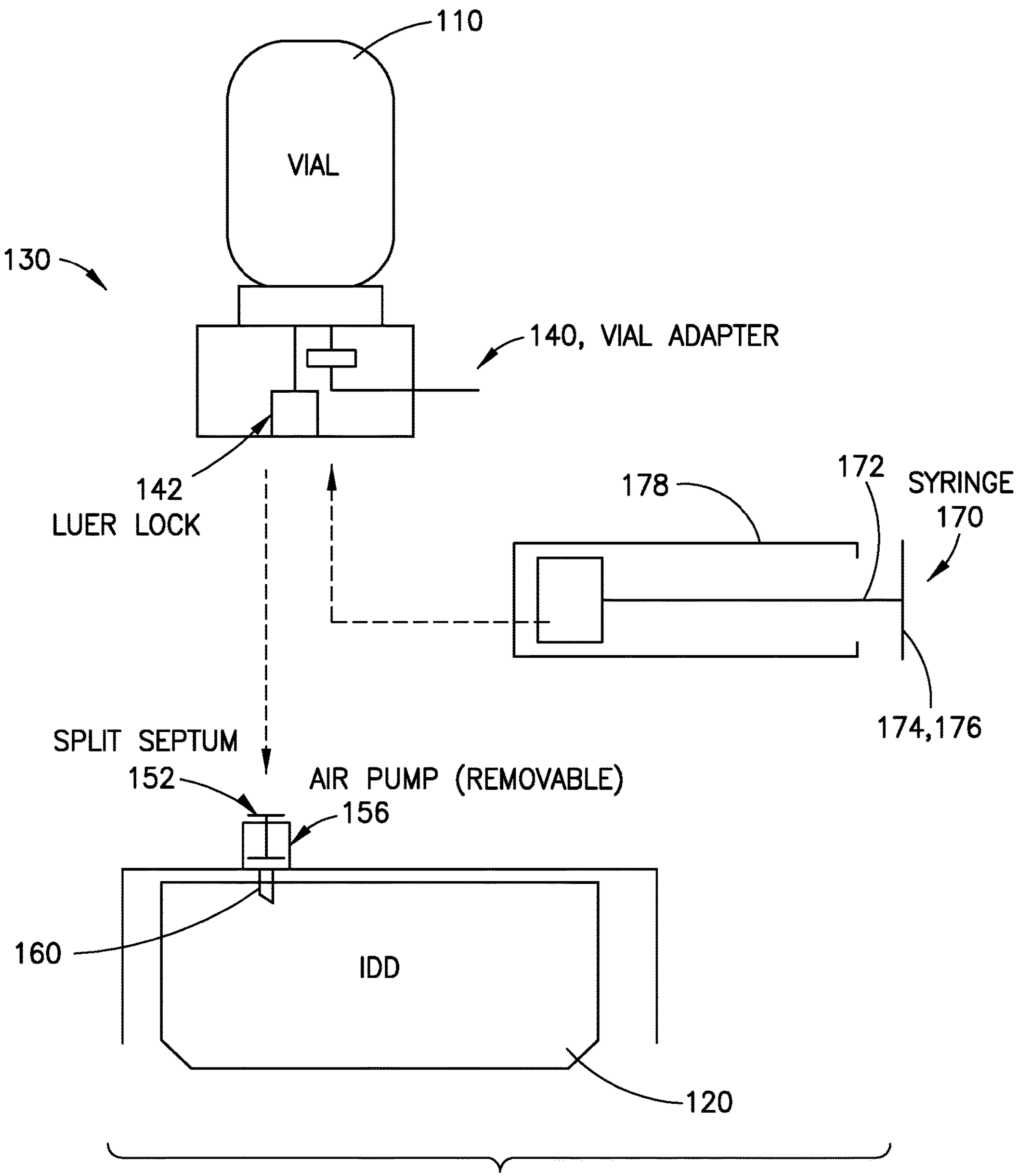
FIG. 6 is a second exemplary embodiment of a schematic of a medicament filling system.

FIGS. 6-10 illustrate a medicament filling system 130, according to a second embodiment. FIG. 6 illustrates a schematic of the medicament filling system 130 that establishes cooperation with a vial 110 and an insulin delivery device 120 as similarly described above. The medicament filling system 130 further includes a needleless vial adapter 140, an alignment platform 150, a needleless syringe 170 and a plunger lock assembly 180. The alignment platform 150 is advantageously the only component in the medicament filling system 130 that uses a needle.

Figure 8:
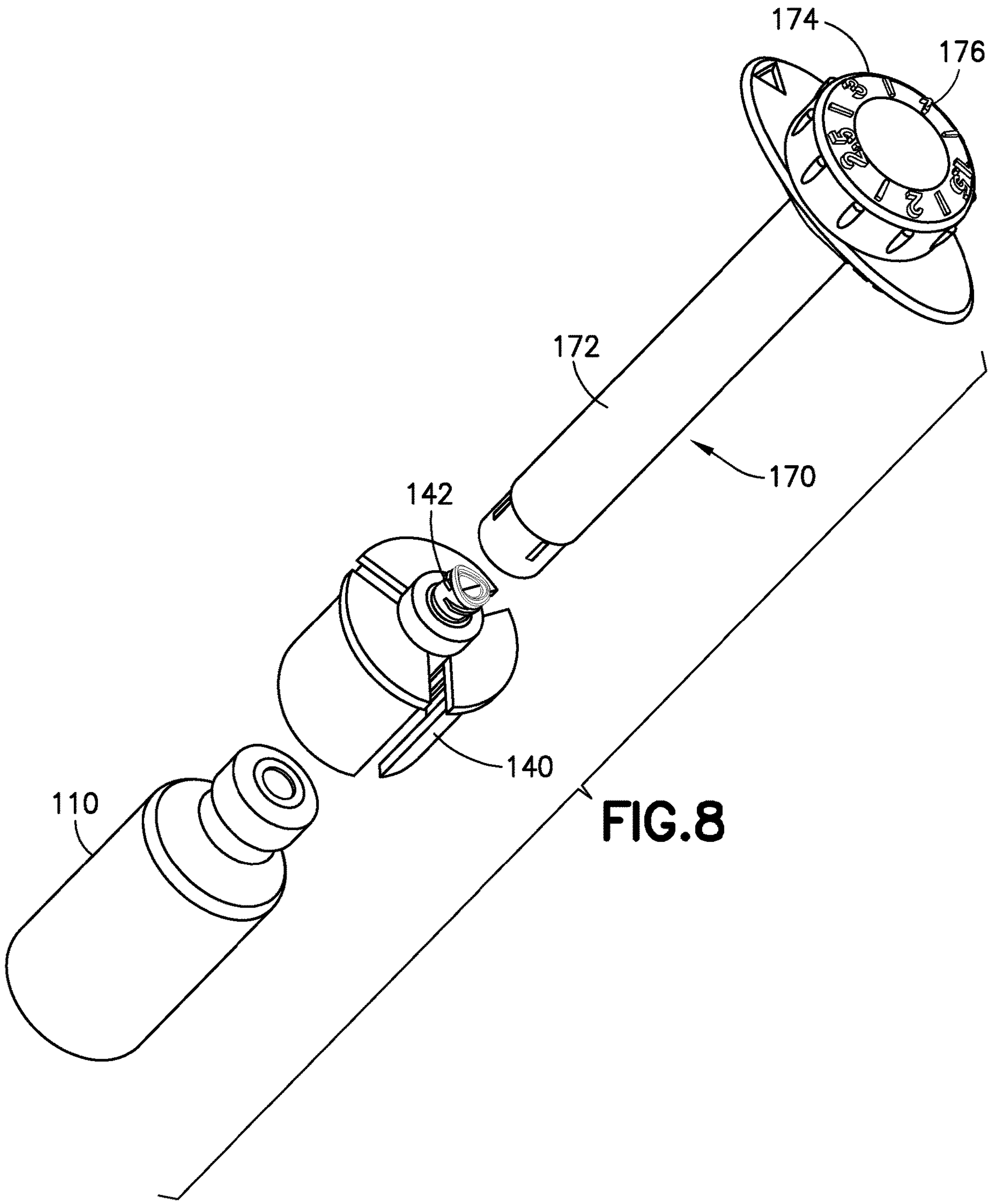
FIG. 8 is an exploded view of a syringe assembly used with the medicament filling system of FIG. 7.

FIGS. 6 and 8 illustrates that a proximal end of the vial adapter 140 includes a luer lock 142. The proximal end of the vial adapter 140 is configured to engage the syringe 170 to establish fluid communication. The distal end of the vial adapter 140 is configured to pierce a septum in the vial 110 via a needle (not shown) to establish fluid communication.

Figure 7:
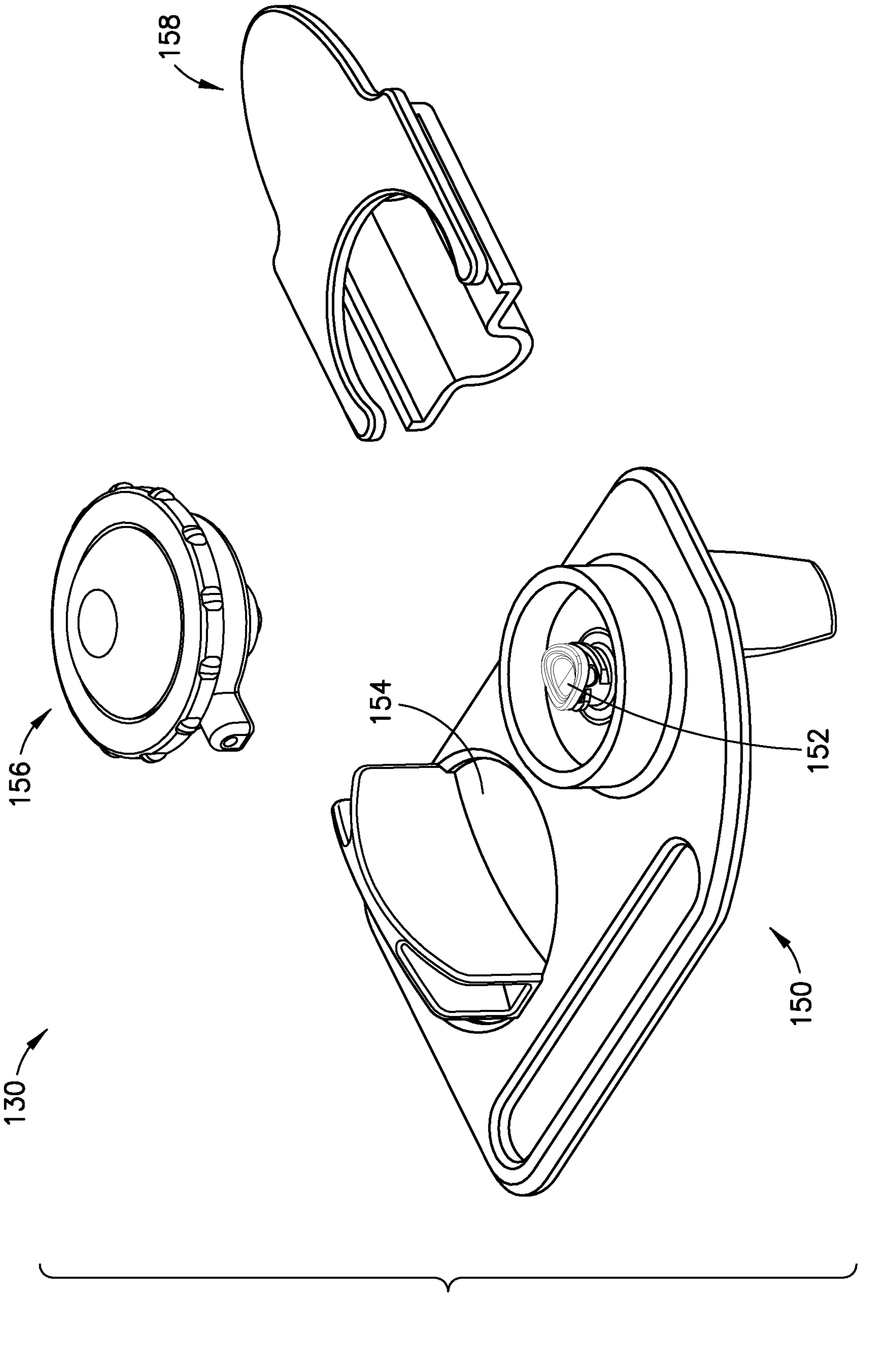
FIG. 7 is an exploded view of the medicament filling system of FIG. 6.

FIGS. 6 and 7 illustrate the alignment platform 150. An underside surface of the alignment platform 150 advantageously provides alignment for mounting purposes and is configured to engage the insulin delivery device 120. The alignment platform 150 includes a split septum 152, a fixture cavity 154, an air pump 156, a needle cover 158 and a needle 160. The split septum 152 provides selective fluid communication with the air pump 156 and the syringe 170. The fixture cavity 154 provides a space to use a fixture for mounting the alignment platform 150 and providing stability.

The air pump 156 is different from the one used in the embodiment described above. Specifically, the air pump 156 is preferably automatically operated but can also be manually operated. The air pump 156 includes two one-way valves and a collapsible chamber such as a bulb, bellow or piston-barrel. The air pump 156 is configured to engage the split septum 152 and remove air from the insulin delivery device 120 prior to filling with medicament. The needle 160, as illustrated in FIG. 6, is disposed on an underside surface of the alignment platform 150 and in-line with the split septum 152. The needle 160 is configured to pierce a septum of the insulin delivery device 120 to establish fluid communication with the alignment platform 150.

The needle cover 158 is used to cover the needle 160 and engage the alignment platform 150. As illustrated in FIG. 7, the needle cover 158 is uniquely shaped to surround the split septum 152 and luer connection while engaging both a top surface and the underside surface of the alignment platform 150 to ultimately cover and enclose the needle 160.

Figure 9:
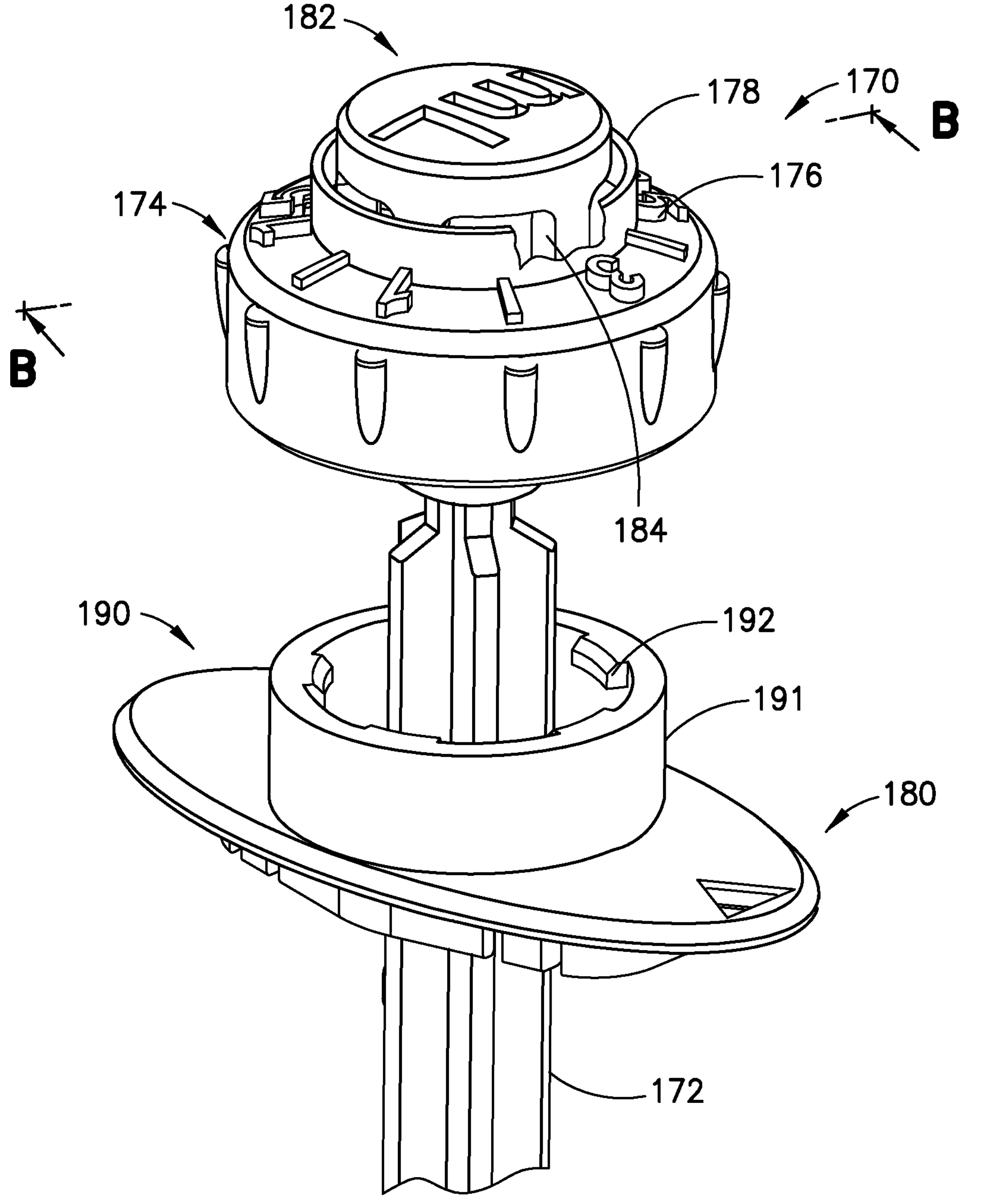
FIG. 9 is a perspective view of a plunger lock assembly used with the syringe assembly of FIG. 8.
Figure 10:
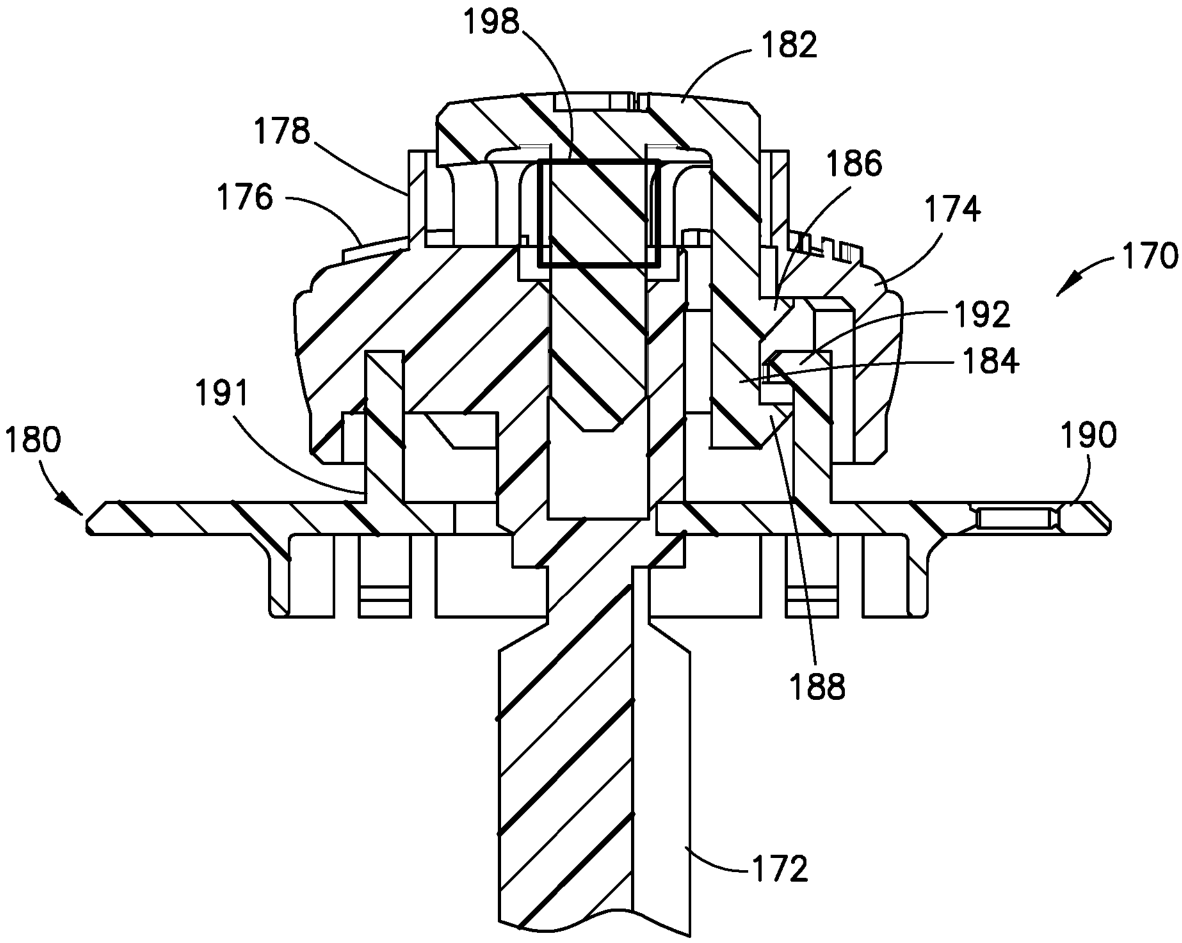
FIG. 10 is across-sectional view of the plunger lock assembly along line B-B of FIG. 9.

FIG. 8 further illustrates the syringe 170 having a plunger 172, a plunger head 174, a dial dose 176 and a syringe barrel (not shown) as conventionally understood by one skilled in the art. FIGS. 9 and 10 illustrate the plunger lock assembly 180 that cooperates with the syringe 170. The plunger lock assembly 180 advantageously locks the plunger 172 when all the medicament is dispensed from the syringe barrel to prevent backflow of the medicament back into the syringe barrel.

The plunger lock assembly 180 includes a lock button 182, a locking flange 184 having first and second protrusions

186, 188, a lock base 190, a circular extrusion 191, a base locking flange 192 and a compression spring 198. The lock button 182 is advantageously and conveniently disposed above the plunger head 174 of the plunger 172. The lock button 182 is button shaped and includes a plurality of legs or locking flanges 184 that extend through cavities in the plunger head 174.

As illustrated in FIGS. 9 and 10, the syringe 170 further includes an anti-accidental push ring 178. The anti-accidental push ring 178 includes an elevated surface surrounding the lock button 182 to advantageously prevent inadvertent depression of the lock button 182. In one embodiment, the anti-accidental push ring 178 includes a continuous wall surrounding the lock button 182. In another embodiment, the anti-accidental push ring 178 includes a wall having gaps spaced out around the lock button 182.

If the user drops the syringe 170, for example, the lock button 182 will not be depressed beyond a top surface of the anti-accidental push ring 178 to safely prevent incidental triggering. The anti-accidental push ring 178 is designed to require a deliberate depression of the lock button 182 that extends into the anti-accidental push ring 178. Such a configuration can advantageously avoid the accidental triggering of the lock button 182 of the plunger lock assembly 180 while allowing a finger of the user to operate the syringe 170.

The plurality of locking flanges 184 each include the first protrusion 186 and the second protrusion 188. The first protrusion 186 secures the plunger lock assembly 180 to the plunger head 174 of the syringe 170. The second protrusion 188 secures the lock button 182 to a lock base 190 when in a locked position.

As illustrated in FIG. 9, the lock base 190 is fixed to syringe barrel, preferably by a snap locking arrangement, although other fixing means are contemplated herein. The lock base 190 includes a circular extrusion 191 extending upward and toward the plunger head 174. A plurality of base locking flanges 192 is disposed in an inner diameter and at a proximal end of the circular extrusion 191. The plurality of base locking flanges 192 engage the second protrusions 188 of the lock button 182 to lock the plunger 172 after the medication is dispensed. The plunger head 174 can also be rotated from a locked position to disengage the plunger 172 from the lock button 182 and enter into the unlocked position.

A compression spring 198 is disposed between the lock button 182 and the plunger head 174 to keep the lock button 182 in the unlocked position before the user compresses the lock button 182 into the locked position. Thus, in the unlocked position, the compression spring 198 is compressed to allow the plunger 172 to operate. However, in the locked position after the medication is dispensed, the compression spring 198 is further compressed to cause the plurality of base locking flanges 192 to engage with the second protrusions 188 of the lock button 182.

FIGS. 11-15 illustrate a syringe assembly 230, according to a third embodiment, that fills a syringe 240 with medicament and dispenses the medicament into an insulin delivery device 220. The syringe assembly 230 includes the syringe 240 having well-known components such as a flange 242 that allows a user to grasp the syringe 240, a barrel 243 that carries medicament, a dose indicator 244 that provides a visual indication of the amount of the medicament in the syringe 240, a plunger 245 that moves the medicament into and out of the barrel 243, a plunger head 246 that provides a space for finger depression/actuation and a needle 248 upon which the medicament flows.

Figure 11:
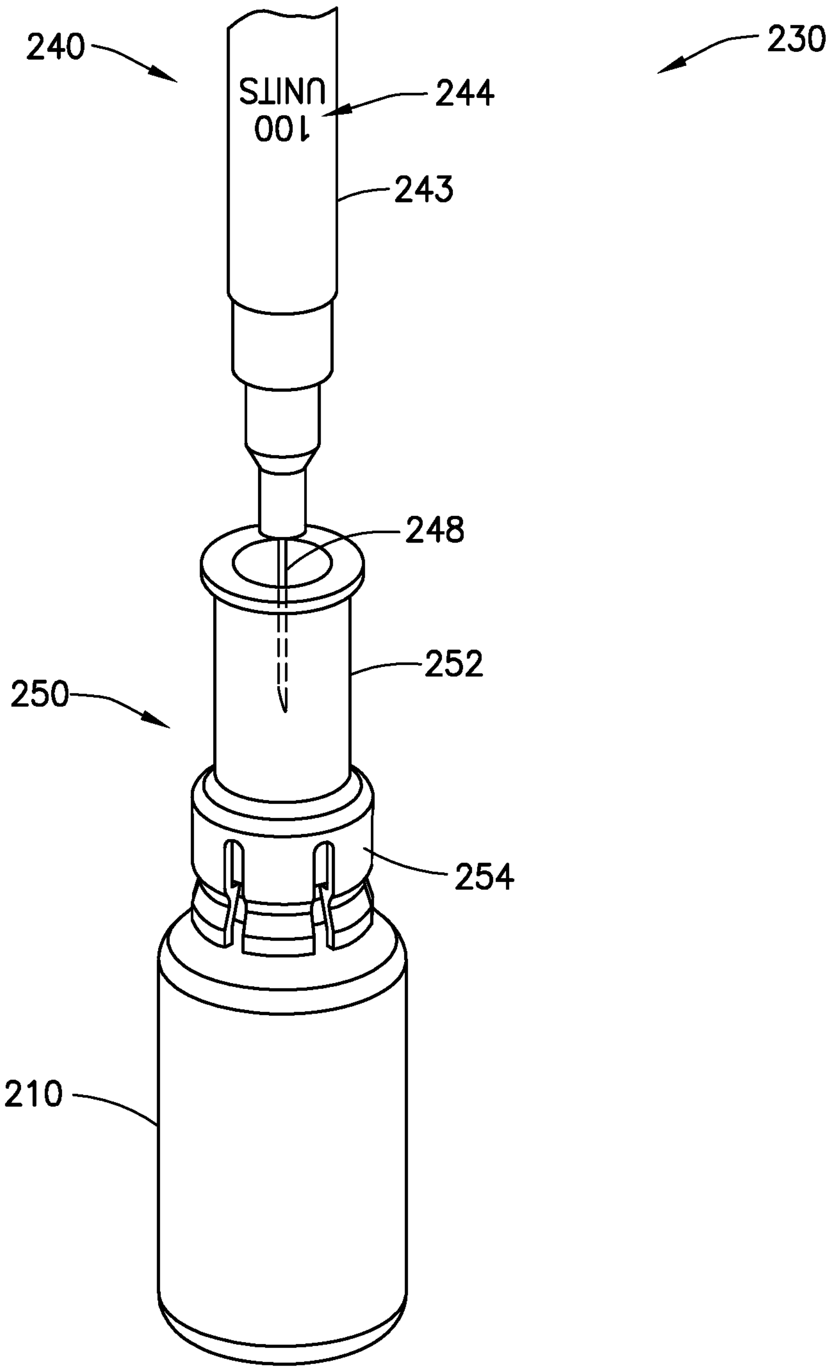
FIG. 11 is a perspective view of a third exemplary embodiment of a syringe assembly attached to a vial via an adapter.
Figure 15:
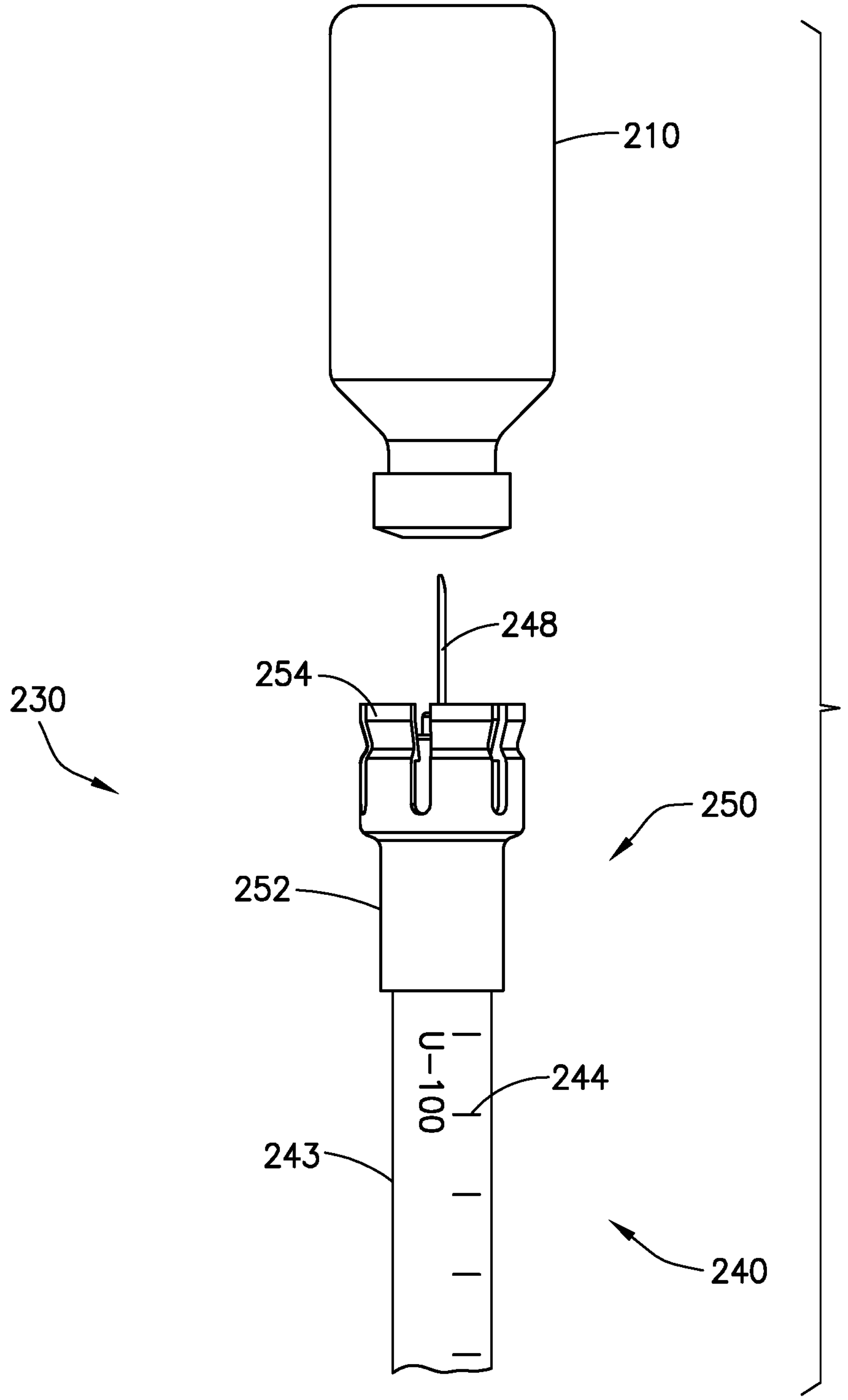
FIG. 15 illustrates the adapter used in the syringe assembly of FIG. 11 when disengaged from the vial.

The syringe assembly 230 further includes an adapter 250 that provides alignment between the syringe 240 and a vial 210, as well as alignment between the syringe 240 and an insulin delivery device 220. The adapter 250 also allows the user to hold the vial 210 and the syringe 240 together when engaged. FIG. 11 illustrates the syringe 230 in the process of engaging the adapter 250, and FIG. 15 illustrates the syringe 230 disengaged from the adapter 250. The adapter 250 includes an alignment tube 252 that aids in aligning the syringe 240 to the vial 210 or to the insulin delivery device 220.

The alignment tube 252 is a larger target compared to the syringe 240. As a result, the alignment tube 252 advantageously allows the user to more efficiently aim the syringe 240 and the adapter 250 into engagement with the vial 210 or into engagement with the insulin delivery device 220. The improved aiming efficiency also advantageously reduces accidental bending of the needle. A locking mechanism 254, preferably a snap lock or threads, is disposed on a distal end of the adapter 250 to engage the vial 210 and the insulin delivery device 220.

Figure 12:
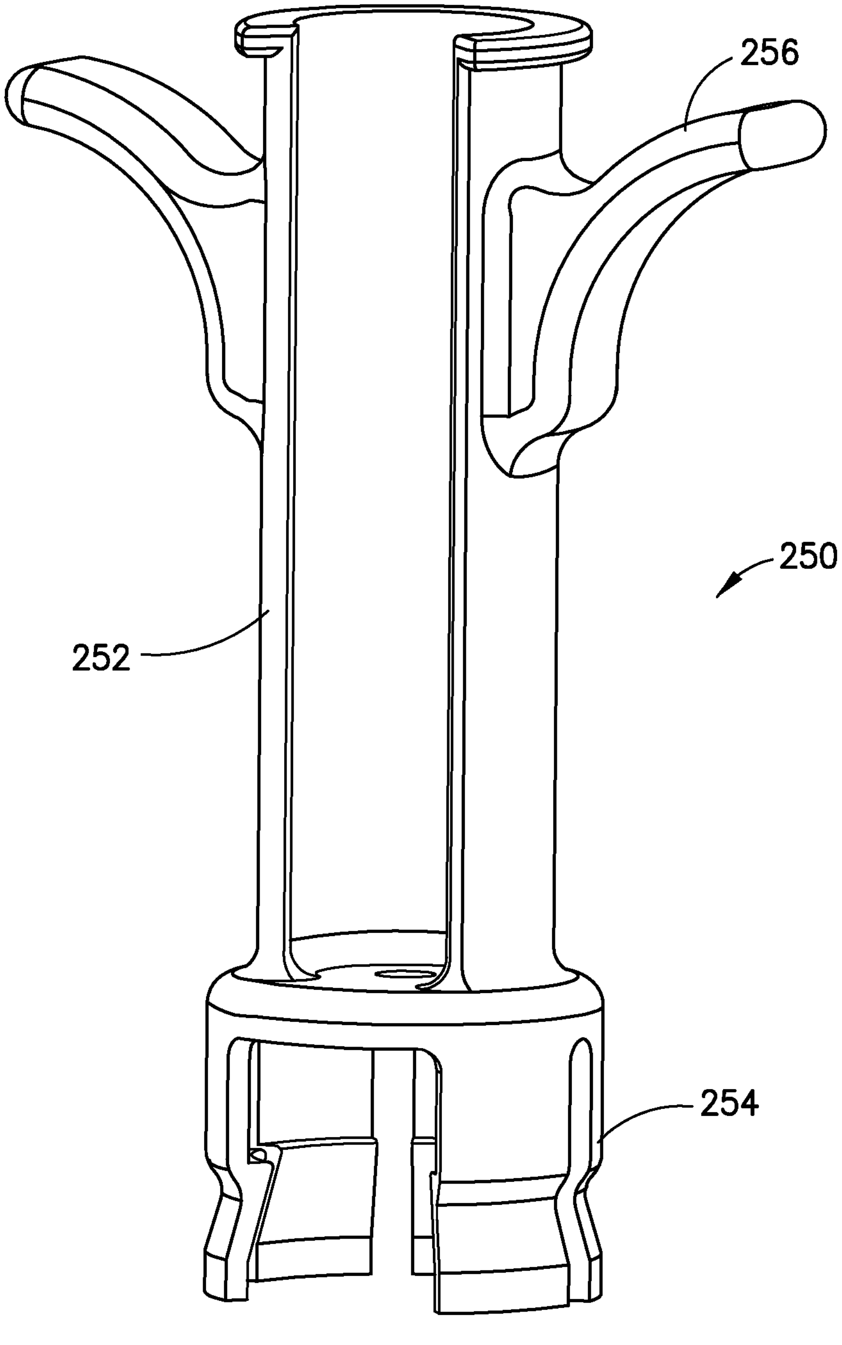
FIG. 12 illustrates a first embodiment of an adapter used in the syringe assembly of FIG. 11.
Figure 13:
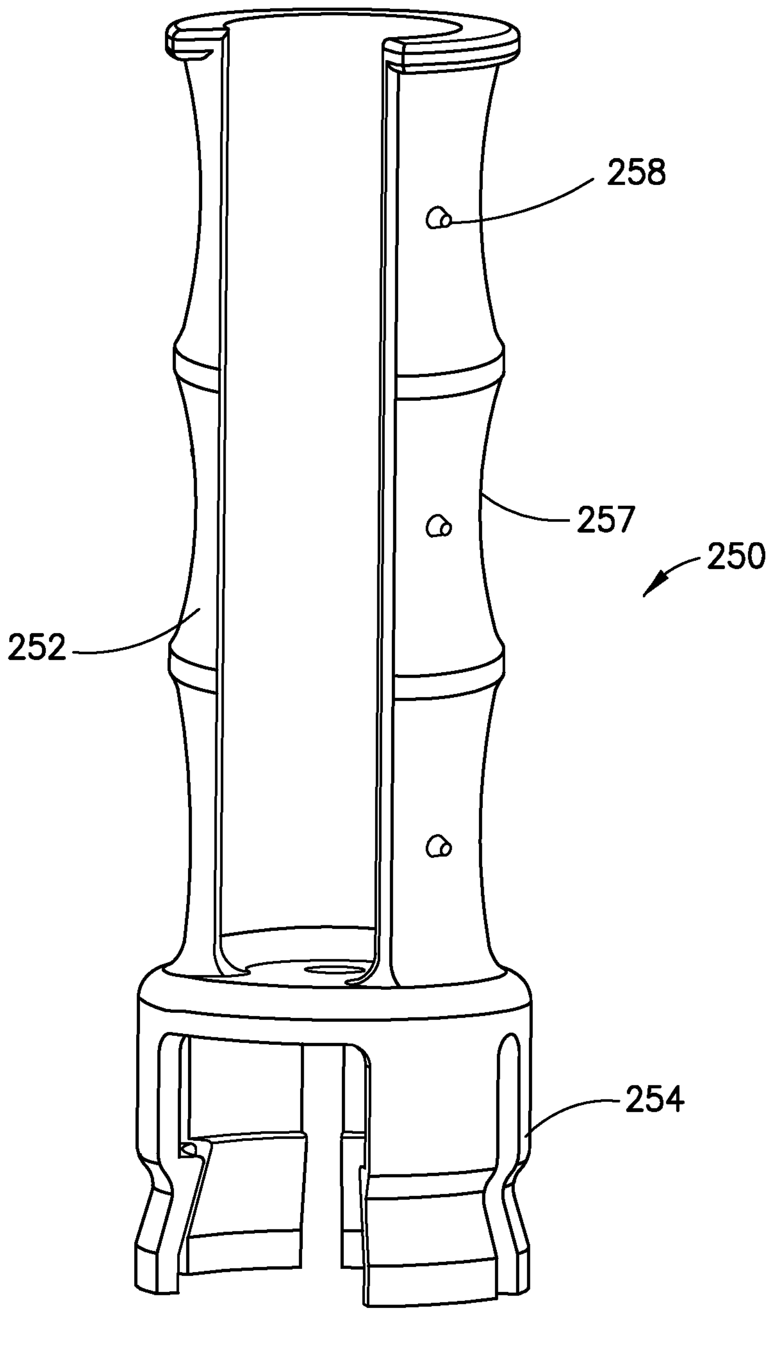
FIG. 13 illustrates a second embodiment of an adapter used in the syringe assembly of FIG. 11.
Figure 14:
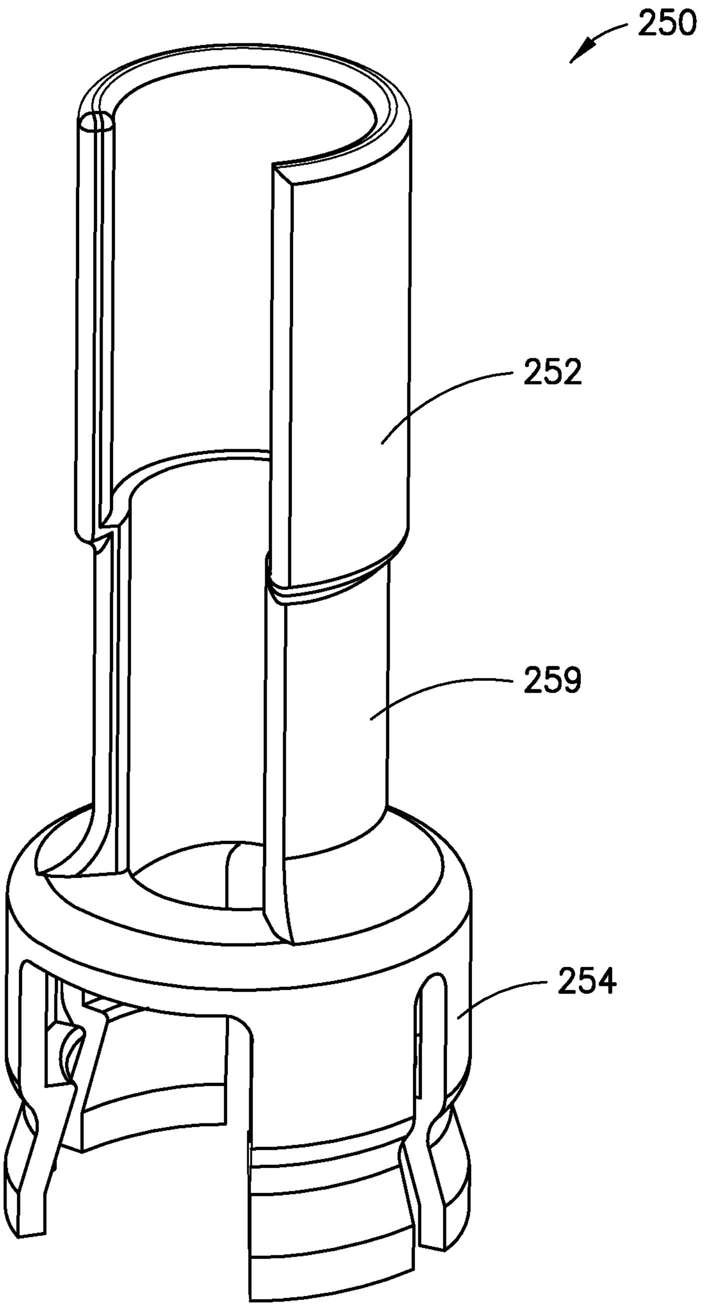
FIG. 14 illustrates a third embodiment of an adapter used in the syringe assembly of FIG. 11.

FIGS. 12-14 illustrate several embodiment of the adapter 250 providing various advantageous features related to ergonomics and controlling needle depth. FIG. 12 illustrates two arms 256 on the alignment tube 252 of the adapter 250 that protrude outwardly from a centerline of the alignment tube 252 to advantageously aid in ergonomically handling and controlling the syringe assembly 230.

FIG. 13 illustrates a plurality of curved depressions 257, each having a protrusion 258 centrally located. The curved depression 257 is advantageously configured to ergonomically engage a finger of the user and the protrusion 258 advantageously provides friction for the user to maintain grip of the adapter 250.

FIG. 14 illustrates a needle depth control mechanism 259. The alignment tube 252 is replaced by, or preferably cooperates with the needle depth control mechanism 259. The needle depth control mechanism 259 includes a sleeve assembly having two or more sleeves that are collinear and rotate with respect to each other. The sleeve assembly functions as a telescoping device that reduces an inner diameter when rotated, similarly to a telescoping pole.

The needle depth control mechanism 259 advantageously controls needle penetration into the vial 210 and the insulin delivery device 220, and reduces needle stick. This configuration is especially advantageous to maximize extraction of the medicament from the vial 210 since a shorter needle can recover more of the medicament. Also, the sleeve assembly of the needle depth control mechanism 259 is collapsible to store the adapter 250 in compact and safe spaces.

Figure 16:
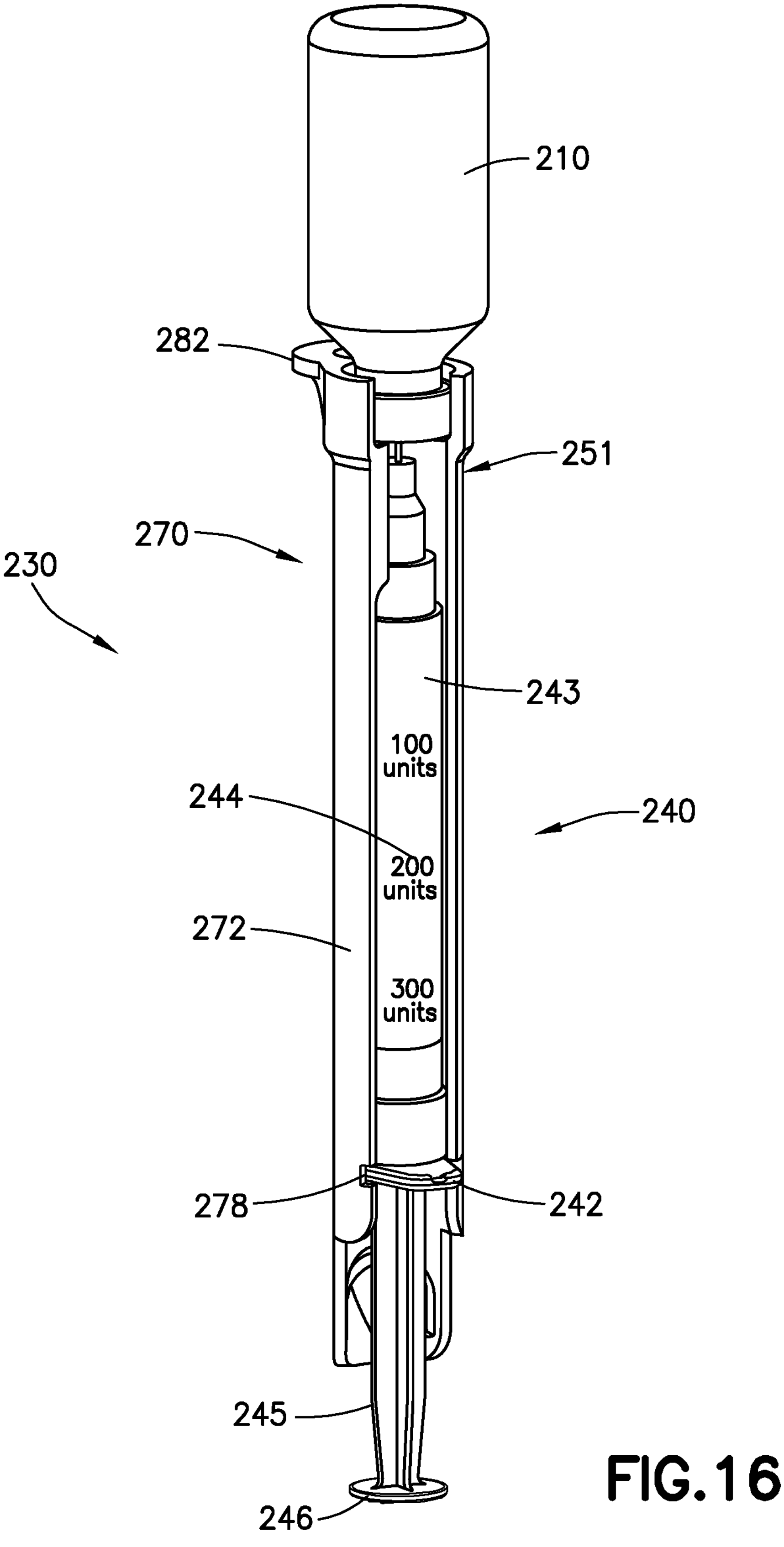
FIG. 16 is a side perspective view of a fourth exemplary embodiment of a syringe assembly having an integrated adapter attached to a vial.
Figure 18:
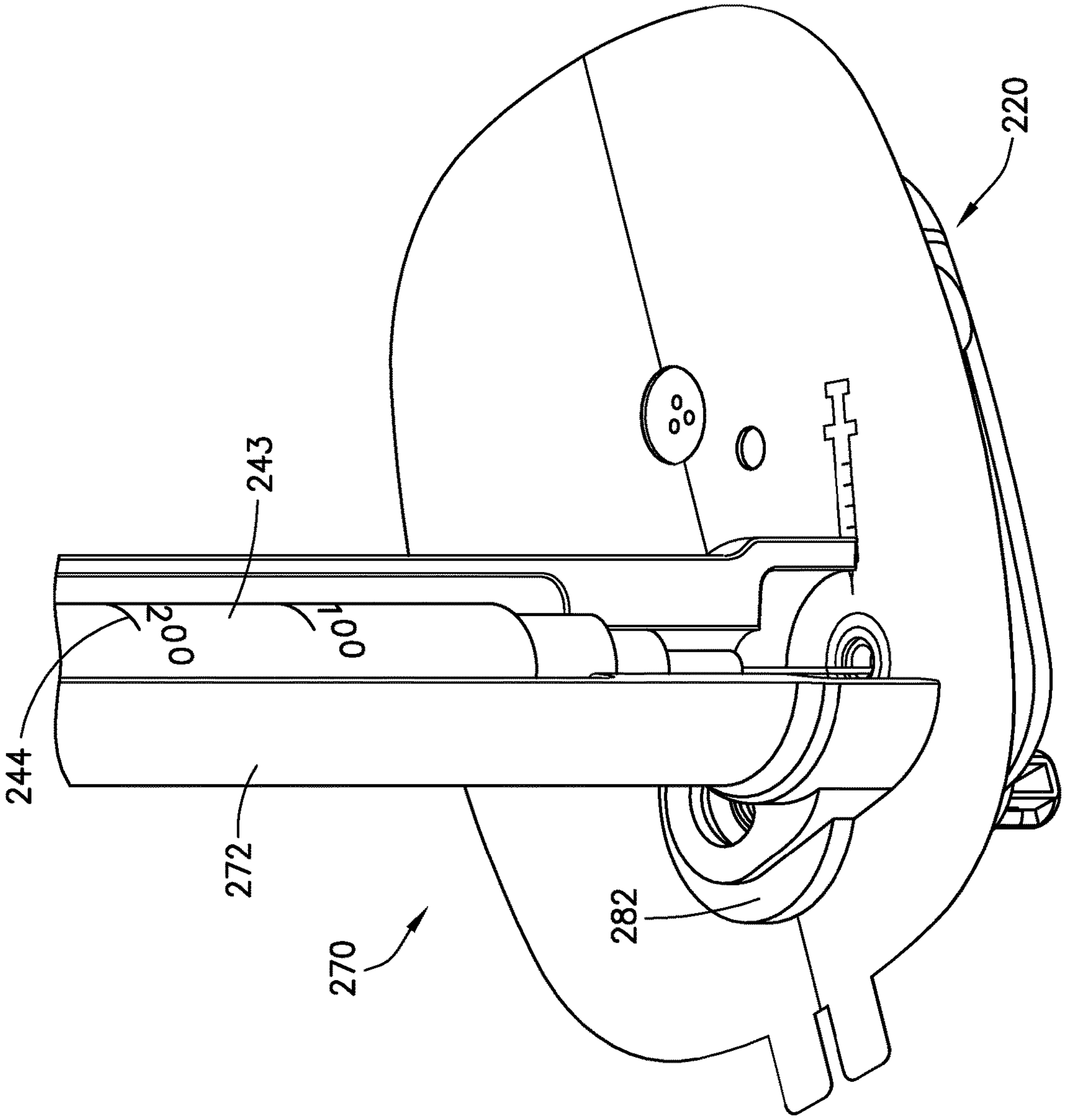
FIG. 18 is a bottom perspective view of the syringe assembly of FIG. 16 mounted to a delivery device.
Figure 17:
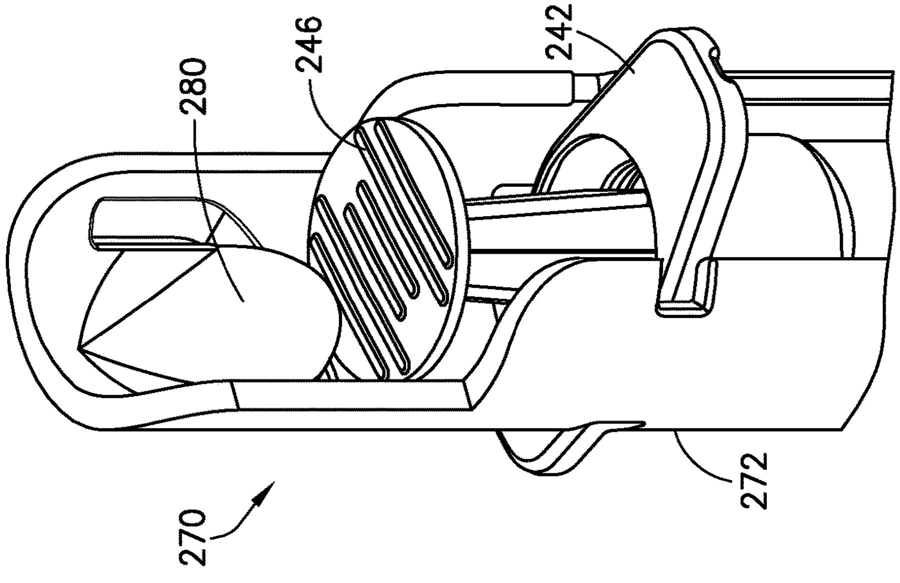
FIG. 17 is a top perspective view of the syringe assembly of FIG. 16.

FIGS. 16-18 illustrate a syringe assembly 230, according to a fourth embodiment, as similarly described above but includes an alternate adapter 251. The adapter 251 of this embodiment is integrated into a plunger lock assembly 270. The plunger lock assembly 270 includes a housing 272, a flange slot 278, a plunger lock 280 and a mounting flange 282.

The housing 272 of the plunger lock assembly 270 carries or encloses the syringe assembly 230. The flange slot 278 is a cavity that engages the flange 242 of the syringe 240. FIG. 17 illustrates that the plunger lock 280 is disposed above the plunger head 246 after the medication is dispensed to prevent backflow from reentering the syringe 240. FIGS. 16 and 18 illustrate the mounting flange 282 disposed at a distal end of the plunger lock assembly 270 to provide engagement to the vial 210 and also provide a mounting surface for alignment when engaging the insulin delivery device 220.

Figure 19:
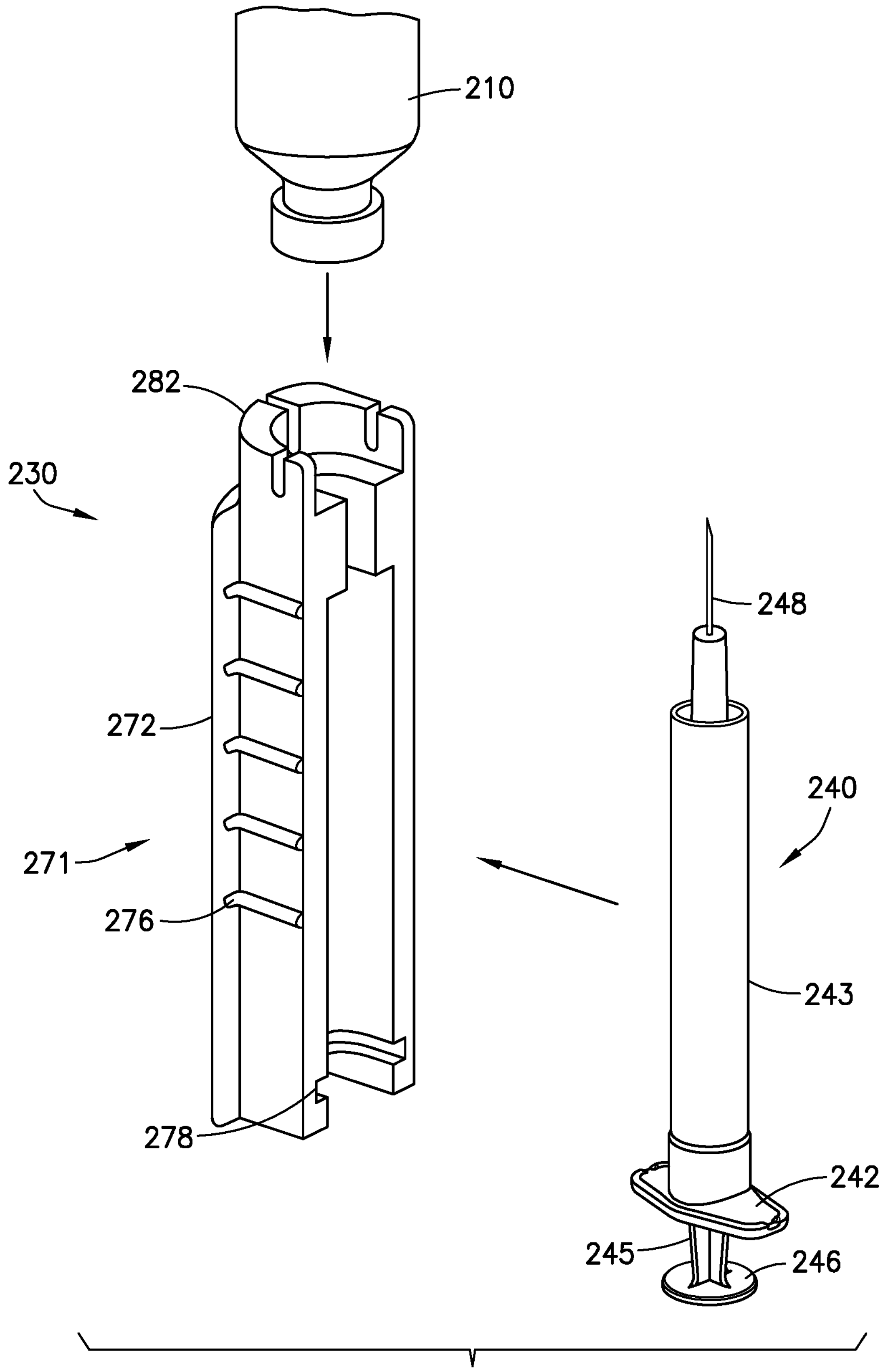
FIG. 19 is a perspective view of a fifth exemplary embodiment of a syringe assembly without an adapter.
Figure 20:
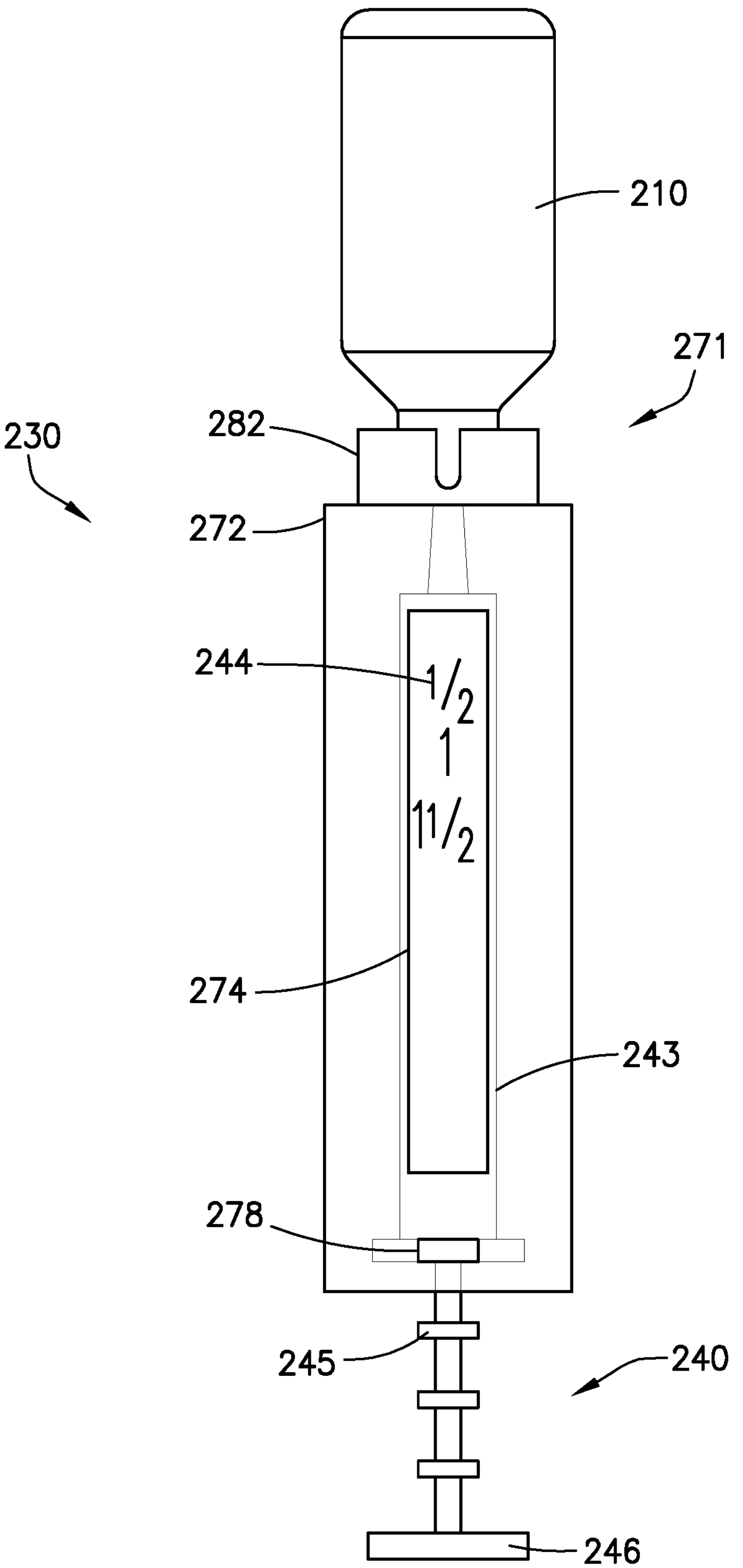
FIG. 20 is a perspective view of the syringe assembly of FIG. 19 engaged to a vial to fill with medicament.
Figure 21:
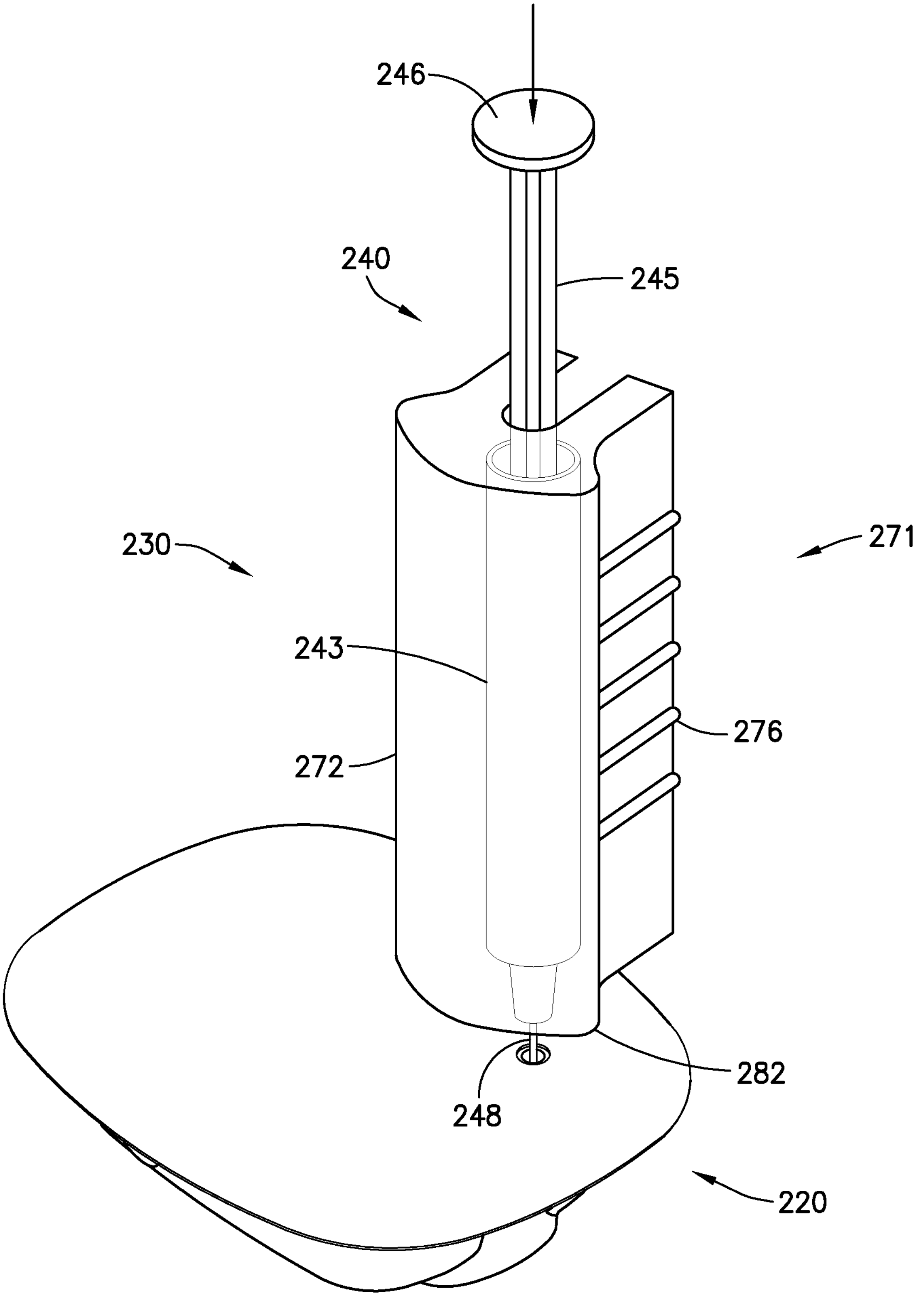
FIG. 21 is a perspective view of the syringe assembly of FIG. 19 engaged to a delivery device to transfer medicament.
Figure 22:
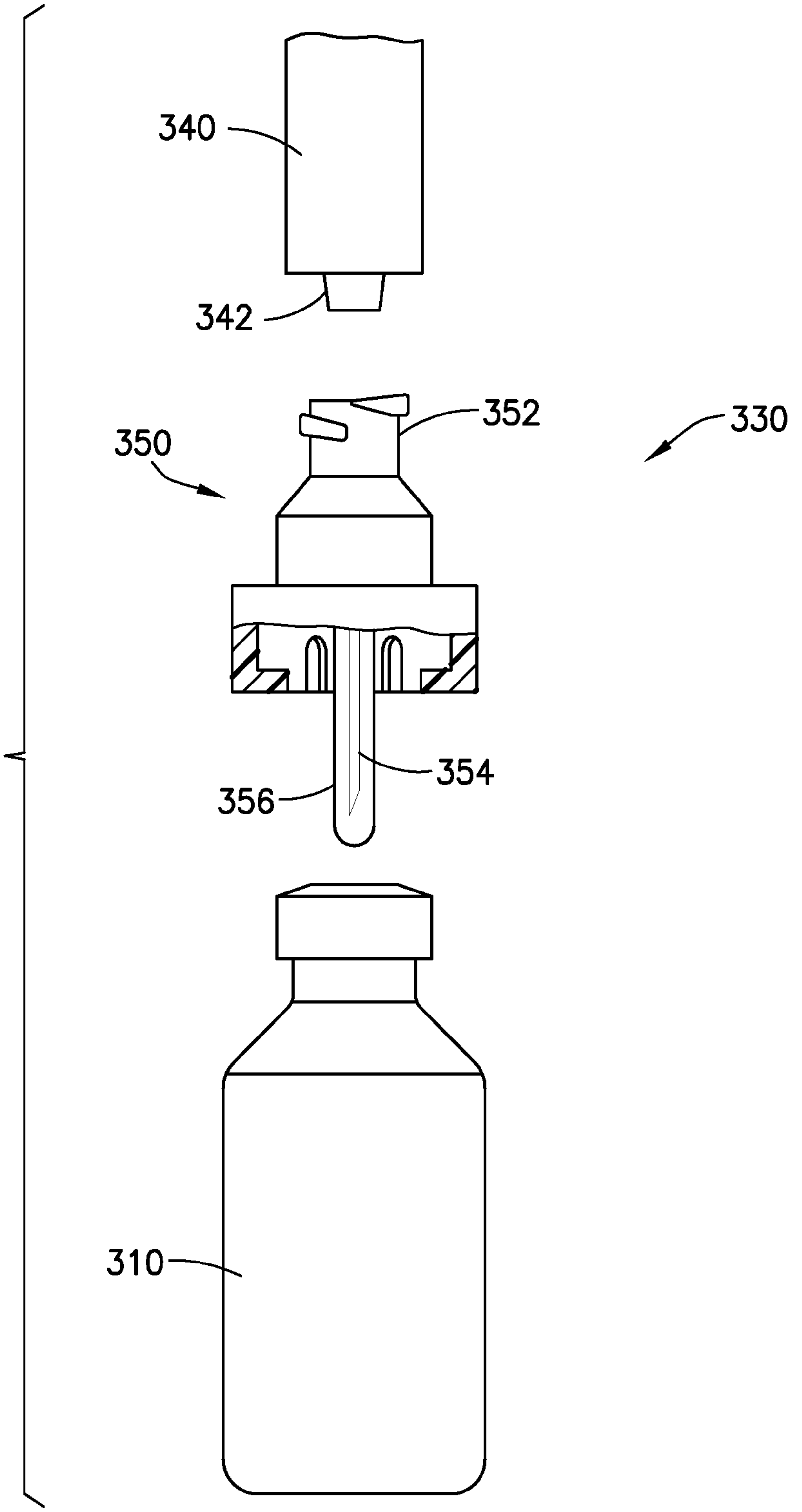
FIG. 22 is an exploded view of a sixth exemplary embodiment of a needleless syringe assembly with an adapter having a needle and a vial.

FIGS. 19-21 illustrate a syringe assembly 230, according to a fifth embodiment without an adapter and with a second embodiment of a plunger lock assembly 271. The plunger lock assembly 271 includes some of the features described above and further includes a dose window 274 and a grip surface 276. Specifically, the housing 272 of the plunger lock assembly 271 includes a grip surface 276 for the user to securely grasp the plunger lock assembly 271.

FIG. 20 illustrates the syringe 240 in the plunger lock assembly 271 engaged to the vial 210. The dose window 274 on the housing 272 of the plunger lock assembly 271 is advantageously magnified to allow the user to conveniently see the dosage amount in the barrel 243 of the syringe 240 and the gradual movement of the plunger 245 during filling and dispensing. FIG. 21 illustrates the syringe 240 in the plunger lock assembly 271 engaged to the insulin delivery device 220 to transfer the medicament.

Figure 23:
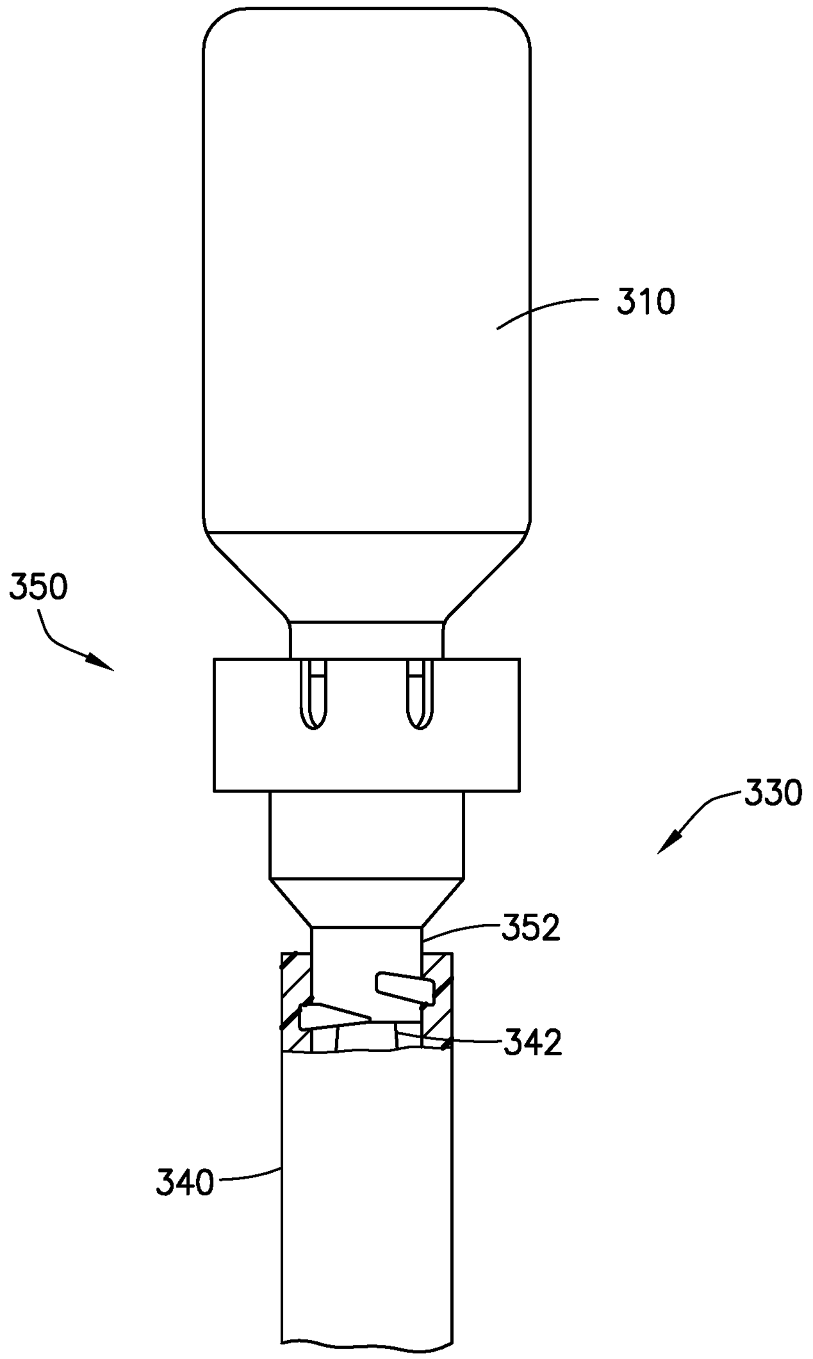
FIG. 23 is a perspective view of the syringe assembly of FIG. 22 shown connected to the vial.
Figure 24:
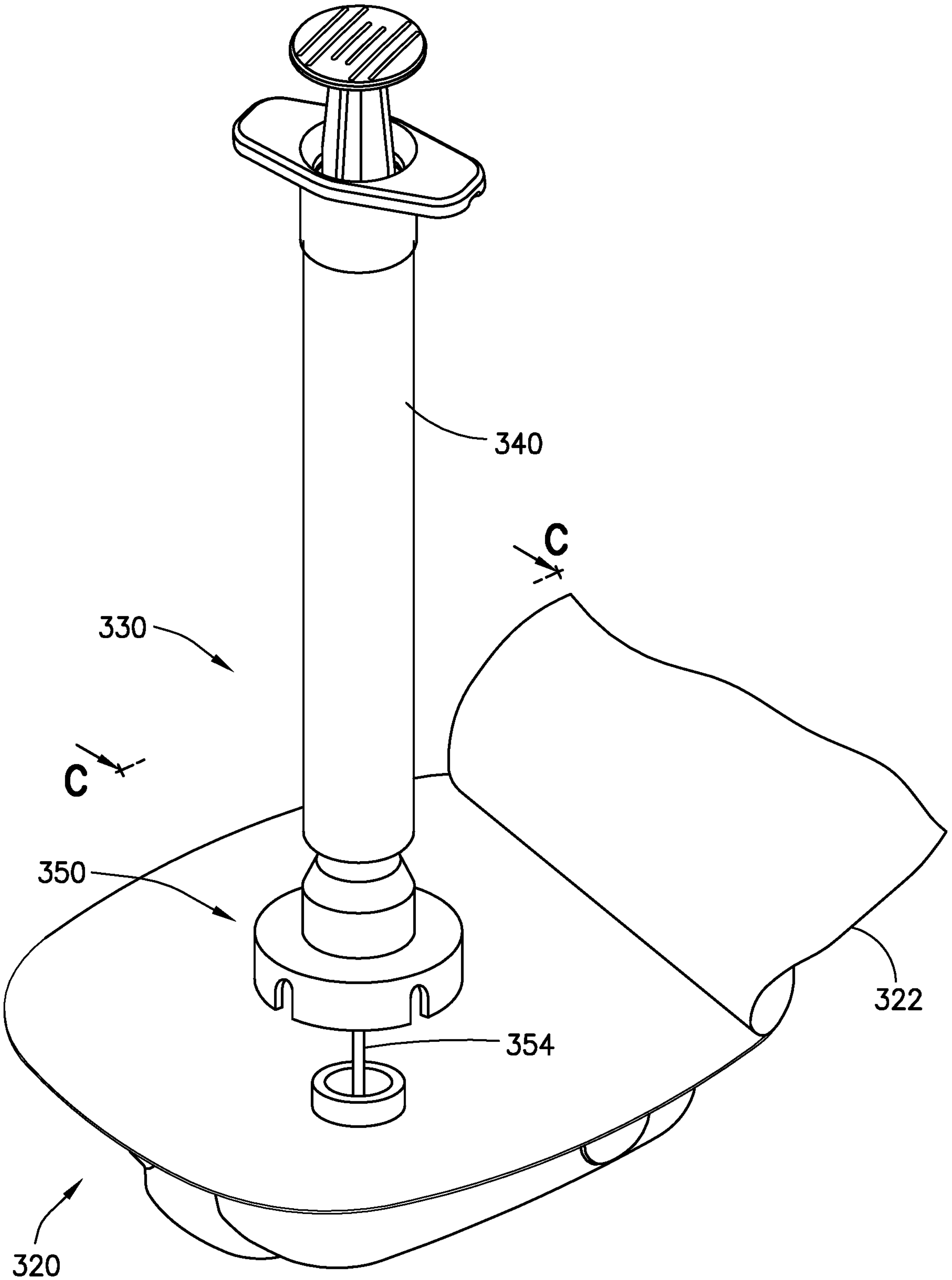
FIG. 24 is a perspective view of the syringe assembly of FIG. 22 shown engaging a delivery device.

FIGS. 22-25 illustrates a syringe assembly 330, according to a sixth embodiment. In this embodiment, a vial 310 and an insulin delivery device 320 are similarly described above. FIG. 24 illustrates the insulin delivery device 320 including a septum 324 and a film cover 322 to enclose the insulin delivery device 320 and the septum 324 prior to use. The septum 324 provides selective fluid communication to the insulin delivery device 320.

The syringe assembly 330 includes a needleless syringe 340 and a syringe connector 342. It is advantageous to use a needless syringe 340 to reduce needle sticking and improve safety. The syringe connector 342 is preferably a luer connector but other forms of engagement are contemplated.

The syringe assembly 330 further includes an adapter 350 configured to engage the vial 310 and the insulin delivery device 320. The adapter 350 includes an adapter connector 352 that is configured to engage the syringe connector 342. A needle 354 is disposed on a distal end of the adapter 350 to engage a septum of the vial 310 and the insulin delivery device 320. Prior to use, the needle 354 is enclosed by a rubber sleeve 356 to protect the needle 354 from inadvertent use.

Figure 25:
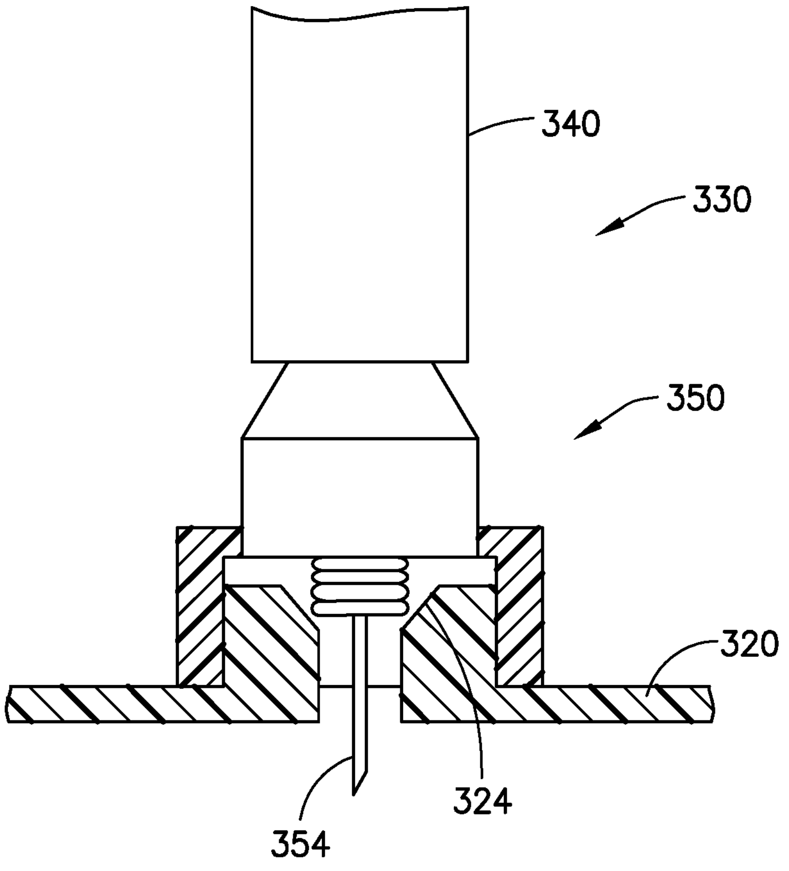
FIG. 25 is a cross-sectional view of the syringe assembly taken along line C-C of FIG. 24 shown engaged to the delivery device.

FIG. 23 illustrates the syringe 330 connected to the adapter 350 and engaged to the vial 310 to fill the syringe 330 with medicament. After filling, FIG. 25 illustrates the syringe 330 connected to the adapter 350 and engaged to the insulin delivery device 320. Specifically, the needle 354 of the adapter 350 pierces the septum 324 of the insulin delivery device 320 to establish fluid communication.

Figure 26:
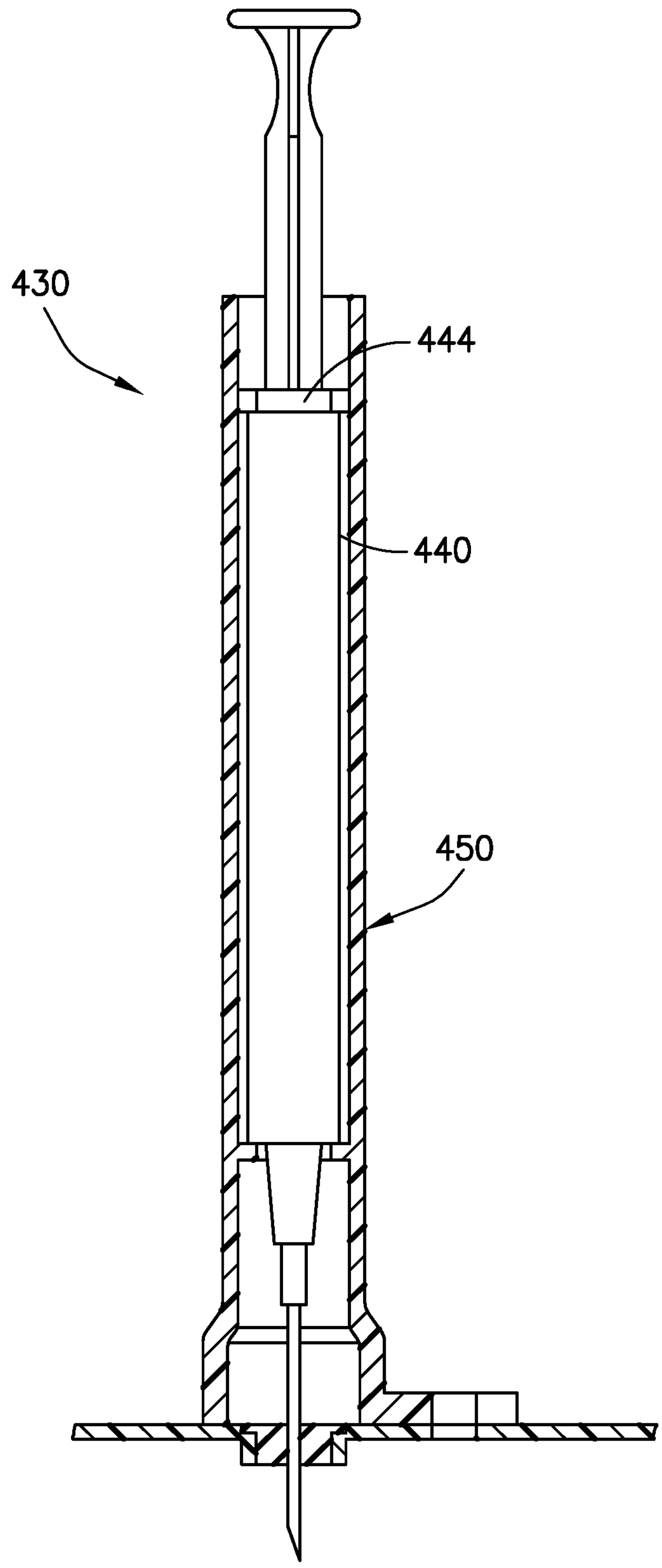
FIG. 26 is across-sectional view of a seventh exemplary embodiment of a syringe assembly with an alignment adapter engaged to a delivery device.
Figure 27:
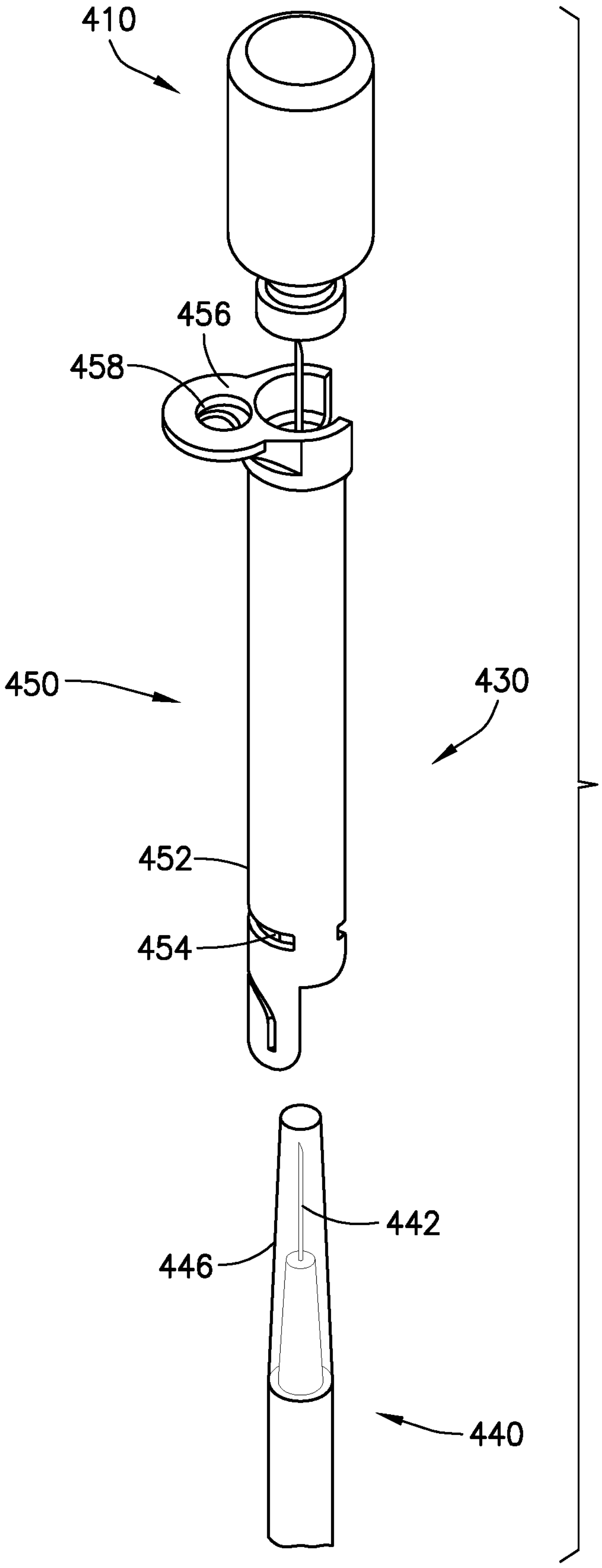
FIG. 27 is an exploded view of the syringe assembly of FIG. 26 and a vial.
Figure 28:
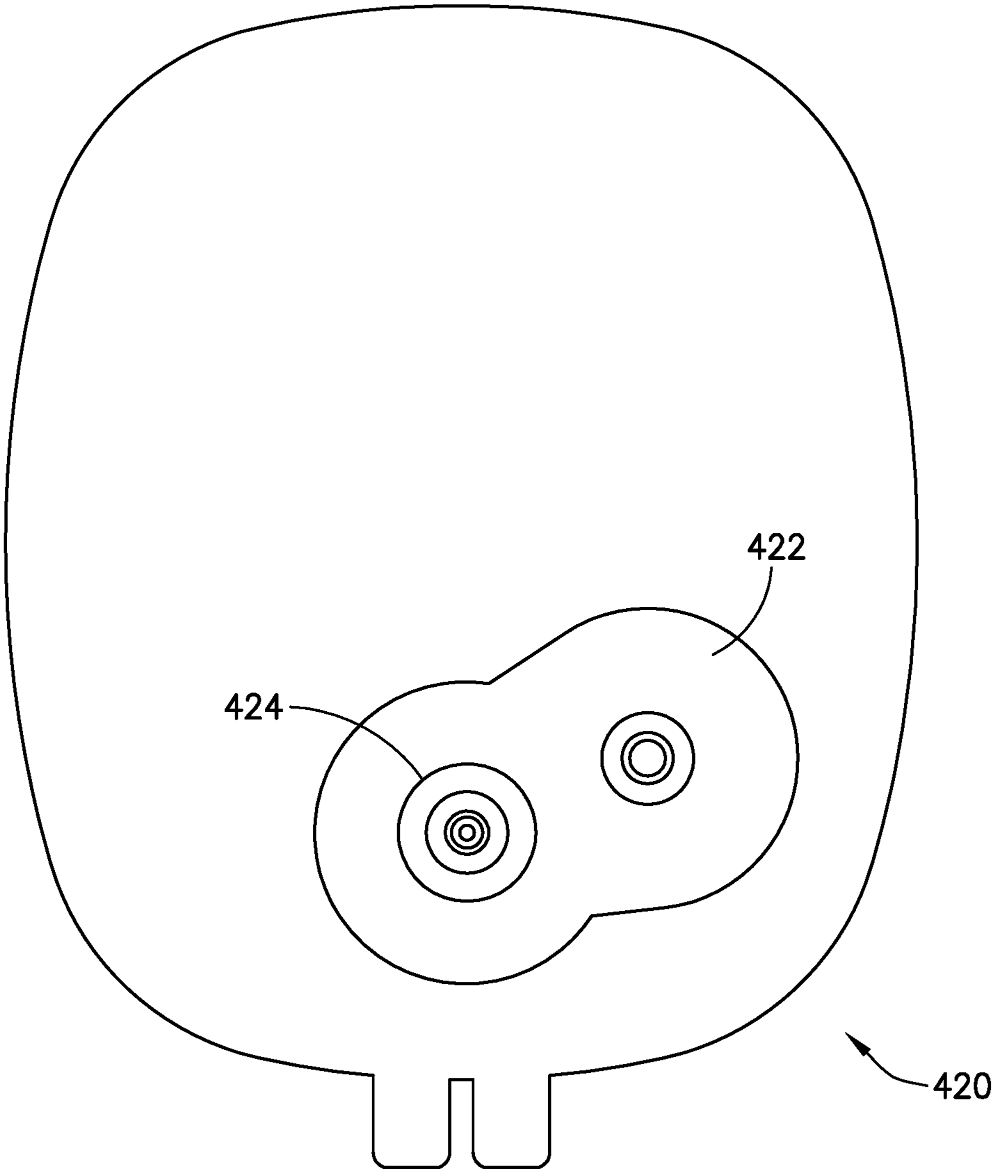
FIG. 28 illustrates a delivery device configured to engage the syringe assembly of FIG. 26.

FIGS. 26-28 illustrates a syringe assembly 430, according to a seventh embodiment. In this embodiment, a vial 410 and an insulin delivery device 420 are similarly described above. However, FIG. 28 illustrates that the insulin delivery device 420 further includes an alignment footprint 422 and a needle port 424. The alignment footprint 422 comprises a profile that is printed on a label of the insulin delivery device 420 to guide engagement of the syringe assembly 430. The needle port 424 is a hole alignment feature to provide mechanical alignment between the insulin delivery device 420 and the syringe assembly 430.

The syringe assembly 430 includes a syringe 440 having a needle 442, a flange 444 and a needle cover 446 as conventionally understood by one skilled in the art. FIG. 26 illustrates the syringe 440 being disposed in an adapter 450. FIG. 27 illustrates an exploded view of the syringe assembly 430 where the adapter 450 includes a housing 452, a slot 454, a base 456 and a hole 458.

The housing 452 is configured to carry the syringe 440. The slot 454 is configured to engage the flange 444 of the syringe 440 to secure the engagement. The base 456 is used to mount onto the insulin delivery device 420 and is also configured to engage the vial 410. As illustrated in FIGS. 27 and 28, the base 456 is positioned on the alignment footprint 422 of the insulin delivery device 420 so that proper alignment and engagement can take place. The hole 458 in the base 456 is used to provide mechanical alignment with the needle port 424 of the insulin delivery device 420.

Figure 29:
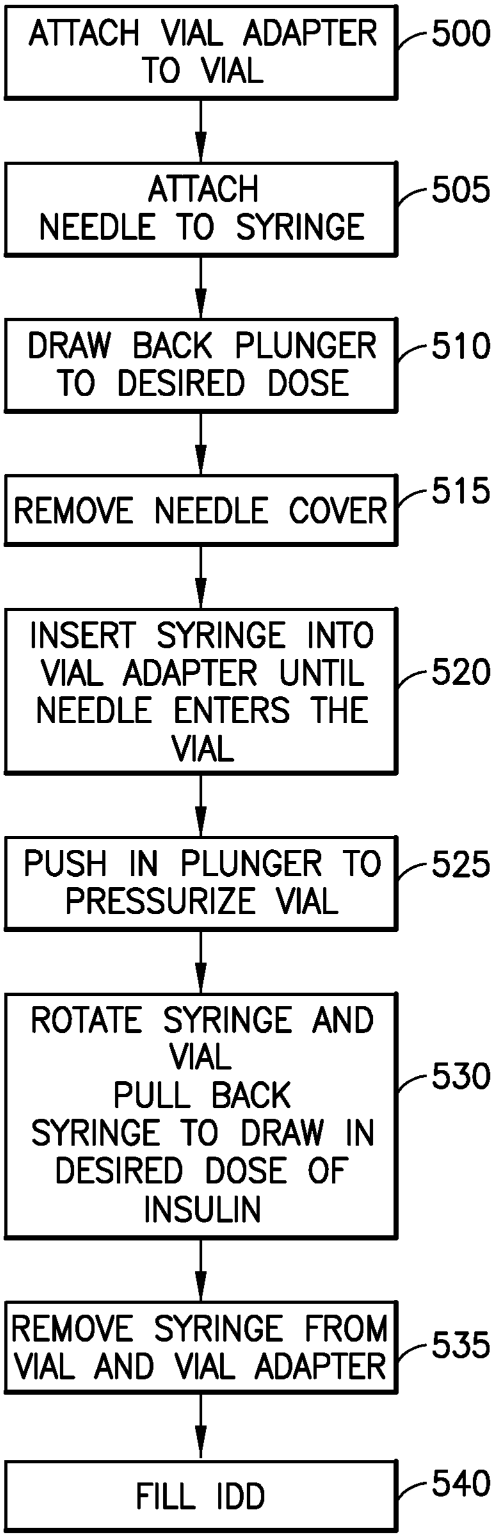
FIG. 29 is a flow diagram of a method for transferring medicament into a syringe assembly using an adapter and prior to expelling the medicament into a delivery device.

FIG. 29 illustrates a flow diagram for a user to transfer medicament from a vial into the syringe assembly in the plurality of relevant embodiments described above using an adapter. This transfer takes place prior to expelling the medicament into the delivery device. Step 500 attaches a vial adapter to a vial. Step 505 attaches a needle to a syringe. Step 510 retracts a plunger to a desired dose. Step 515 moves a needle cover. Step 520 inserts a syringe into a vial adapter until the needle enter the vial. Step 525 depresses the plunger to provide air pressure into the vial. Step 530 rotates the syringe and vial such that the vial is above the syringe. Subsequently, the user retracts the plunger to draw in a desired dose of medicament. Step 535 removes the syringe from the vial and the vial adapter. In step 540, the syringe is now ready to fill the insulin delivery device.

The foregoing detailed description of the certain exemplary embodiments has been provided for explaining the principles of the invention and its practical application, thereby enabling others skilled in the art to understand the invention for various embodiments and with various modifications as are suited to the particular use contemplated. This description is not necessarily intended to be exhaustive or to limit the invention to the precise embodiments disclosed. In addition, any of the embodiments, features and/or elements disclosed herein may be combined with one another to form various additional combinations not specifically disclosed, as long as the embodiments, features and/or elements being combined do not contradict each other. Accordingly, additional embodiments are possible and are intended to be encompassed within this specification and the scope of the invention. The specification describes specific examples to accomplish a more general goal that may be accomplished in another way.

As used in this application, the terms "front," "rear," "upper," "lower," "upwardly," "downwardly." and other orientational descriptors are intended to facilitate the description of the exemplary embodiments of the present invention, and are not intended to limit the structure of the exemplary embodiments of the present invention to any particular position or orientation. Terms of degree, such as "substantially" or "approximately" are understood by those of ordinary skill to refer to reasonable ranges around and including the given value, for example, general tolerances associated with manufacturing, assembly, and use of the described embodiments.

The invention claimed is:

1. A medicament filing system that provides medicament to a delivery device, the medicament filling system comprising:

a main housing having:

an air pump;

a vial adapter that is configured to engage a vial containing medicament, the vial adapter being in communication with the air pump;

a barrel being in selective communication with the vial adapter and the delivery device; and a valve that locks and unlocks movement of a plunger in the barrel.

2. The medicament filling system of claim 1, wherein:
the valve is unlocked for the barrel to remove air from the delivery device;
the valve is locked to prevent the barrel from receiving the medicament from the vial adapter beyond a preset dose;
the valve is unlocked to deliver the medicament from the barrel to the delivery device; and
the valve is locked after the medicament delivery to prevent backflow from the delivery device into the barrel.

3. The medicament filling system of claim 1, wherein:
the valve includes a button connected to a stopping element that engages and disengages the plunger in the barrel;
when the button is depressed, the plunger in the barrel is disengaged from the stopping element; and
the delivery device is disposed on an external surface of the main housing.

4. The medicament filling system of claim 3, wherein:
the valve further includes:
an arm including the stopping element on a distal end of the arm; and
a pivot shaft;
wherein the arm rotates with respect to the pivot shaft to engage and disengage the stopping element to the plunger in the barrel.

5. The medicament filling system of claim 1, wherein:
the plunger of the barrel vents air from the barrel;
the plunger includes a dial dose at a proximal end of the plunger and corresponding dial dose stop positions to indicate dosage;
the barrel includes a viewing window to indicate an amount of the medicament disposed in the barrel; and
the delivery device engages a distal surface of the main housing.

6. A method of using a medicament filling system to fill medicament into a delivery device, the method comprising:
attaching the medicament filling system to the delivery device;
establishing fluid communication between the delivery device and the medicament filling system;
connecting a vial to the medicament filling system to establish fluid communication;
setting a dose on a plunger of a barrel in the medicament filling system;
releasing the plunger of the barrel;
pulling the plunger to remove air from the delivery device;
transferring the medicament from the vial to the barrel; and
filling the delivery device with medicament.

7. The method of claim 6, comprising rotating the plunger of the barrel to set the dosage.

8. The method of claim 6, comprising operating a valve to lock and unlock the plunger of the barrel.

9. The method of claim 6, comprising pumping air into the vial to transfer the medicament from the vial to the barrel.

10. The method of claim 6, comprising venting excess air from the plunger of the barrel.

11. A medicament filing system that provides medicament to a delivery device, the medicament filling system comprising:
an alignment platform having a needle configured to be in communication with the delivery device, the alignment platform including:
an air pump that removes air from the delivery device;
a septum configured to engage the air pump; and
a needle cover that encloses the needle when not in use.

12. A syringe assembly for providing medicament to a delivery device, the syringe assembly comprising:
a syringe, comprising:
a dial dose that sets a dosage amount, the dial dose being disposed on a plunger head;
a plunger including the plunger head disposed on a proximal end of the plunger; and
a syringe barrel connected to a needle; and
a plunger lock assembly;
wherein after the syringe delivers the medicament to the delivery device, the plunger lock assembly prevents backflow of the medicament into the syringe.

13. The syringe assembly of claim 12, wherein the plunger lock assembly further comprises:
a lock button disposed on the plunger head; and
a lock base attached to the syringe barrel;
wherein the lock button is engaged to the lock base in a locked position to prevent backflow from entering the syringe barrel.

14. The syringe assembly of claim 13, wherein
the lock button and the lock base each include locking flanges that engage in the locked position; and
the syringe includes a ring surrounding the lock button to prevent accidental depression of the lock button.

15. The syringe assembly of claim 13, further comprising:
a vial adapter that engages a vial and the syringe;
wherein the syringe is filled with medicament prior to engagement with the delivery device.

16. The syringe assembly of claim 12, wherein
the plunger lock assembly is configured to engage the plunger head and the syringe barrel; and
the plunger lock assembly prevents backflow of the medicament into the syringe via engagement of the plunger head to the syringe barrel.

17. A syringe assembly for filling a syringe and a delivery device with medicament, the syringe assembly comprising:
a syringe having a needle for transferring the medicament; and
an adapter configured to engage a vial carrying the medicament;
wherein the adapter includes one of an ergonomic feature and a needle depth control feature; and
a distal end of the adapter is configured to engage a delivery device to fill with medicament.

18. The syringe assembly of claim 17, wherein:
the adapter includes:
an alignment tube that incorporates the one of the ergonomic feature and the needle depth control feature; and
a locking mechanism that is configured to engage the vial.

19. A syringe assembly for filling a syringe and a delivery device with medicament, the syringe assembly comprising:
a syringe having a needle for transferring the medicament; and
an adapter configured to engage a vial carrying the medicament, the adapter includes:
an alignment tube that incorporates one of the ergonomic feature and the needle depth control feature; and
a locking mechanism that is configured to engage the vial;
wherein a proximal end of the alignment tube includes the ergonomic feature having two or more arms that protrude outwardly from a centerline of the alignment tube.

20. A syringe assembly for filling a syringe and a delivery device with medicament, the syringe assembly comprising:
a syringe having a needle for transferring the medicament; and
an adapter configured to engage a vial carrying the medicament, the adapter includes:
an alignment tube that incorporates one of the ergonomic feature and the needle depth control feature; and
a locking mechanism that is configured to engage the vial;
wherein the alignment tube includes the ergonomic feature having two or more curved depressions, each depression including a protrusion.

21. A syringe assembly for filling a syringe and a delivery device with medicament, the syringe assembly comprising:
a syringe having a needle for transferring the medicament; and
an adapter configured to engage a vial carrying the medicament, the adapter includes:
an alignment tube that incorporates one of the ergonomic feature and the needle depth control feature; and
a locking mechanism that is configured to engage the vial;
wherein the needle depth control feature includes two concentric collars that are rotatably fixed to each other to vary a length of the alignment tube.

22. A syringe assembly for filling a syringe and a delivery device with medicament, the syringe assembly comprising:
a syringe having a needle for transferring the medicament;
an adapter configured to engage a vial carrying the medicament; and
a plunger lock assembly that carries the syringe and the adapter;
wherein the plunger lock assembly is configured to lock a plunger of the syringe in a locked position; and
wherein the adapter includes one of an ergonomic feature and a needle depth control feature.

23. The syringe assembly of claim 22, wherein the plunger lock assembly comprises:
a housing, including:
a dose window that magnifies a dose indicator; and
a grip surface to aid in handling of the plunger lock assembly.

24. The syringe assembly of claim 23, wherein:
the syringe includes:
a flange disposed at a proximal end of a barrel; and
a plunger having a plunger head that cooperates with the barrel; and
the plunger lock assembly includes:
a slot to engage the flange of the syringe; and
a plunger lock disposed above the plunger head after the medicament is delivered to prevent backflow into the syringe.

25. A syringe assembly for filling a syringe and a delivery device with medicament, the syringe assembly comprising:
a needleless syringe having a syringe connector; and
an adapter, including:
a needle that is configured to engage a vial carrying the medicament; and
an adapter connector that is configured to engage the syringe connector;
wherein a distal end of the adapter engages the vial to receive medicament and engages the delivery device to transfer the medicament.

26. The syringe assembly of claim 25, wherein the adapter includes a sleeve that covers the needle.

27. A syringe assembly for filling a syringe and a delivery device with medicament, the syringe assembly comprising:
a syringe having a needle for transferring the medicament;
an adapter attached to the syringe and configured to engage a vial carrying the medicament, wherein the adapter includes:
a housing that encloses the syringe; and
a base that is configured to mount onto the delivery device;
wherein when the adapter is engaged to the vial, the medicament travels from the vial to the syringe; and
wherein when the adapter is engaged to the delivery device, the medicament travels from the syringe to the delivery device.

28. The syringe assembly of claim 27, wherein the base of the adapter includes a hole that aligns with a needle port in the delivery device.

29. The syringe assembly of claim 27, wherein the adapter includes a slot that engages a flange of the syringe to secure the syringe.

* * * * *